United States Patent
Ito et al.

(10) Patent No.: US 9,309,422 B2
(45) Date of Patent: Apr. 12, 2016

(54) INK SET FOR INKJET RECORDING AND IMAGE FORMING METHOD

(71) Applicant: FUJIFILM CORPORATION, Minato-ku, Tokyo (JP)

(72) Inventors: Orie Ito, Kanagawa (JP); Kaoru Tojo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 14/016,142

(22) Filed: Sep. 2, 2013

(65) Prior Publication Data
US 2014/0092168 A1 Apr. 3, 2014

(30) Foreign Application Priority Data

Sep. 28, 2012 (JP) .................................. 2012-218840

(51) Int. Cl.
*C09D 11/00* (2014.01)
*C09D 11/30* (2014.01)
*B41J 2/165* (2006.01)
*C09D 11/101* (2014.01)
*C09D 11/38* (2014.01)
*C09D 11/40* (2014.01)
*C09D 11/54* (2014.01)

(52) U.S. Cl.
CPC ............. *C09D 11/30* (2013.01); *B41J 2/16552* (2013.01); *C09D 11/101* (2013.01); *C09D 11/38* (2013.01); *C09D 11/40* (2013.01); *C09D 11/54* (2013.01)

(58) Field of Classification Search
CPC ...... C09D 11/30; C09D 11/322; C09D 11/38; C09D 11/40; C09D 11/54; C09D 11/101; B41J 2/16552; B41J 2/2107; B41J 2/2114
USPC ............ 347/21, 28, 95–100; 106/31.13, 31.6, 106/31.65, 31.75, 31.85
See application file for complete search history.

(56) References Cited

U.S. PATENT DOCUMENTS

| | | | | |
|---|---|---|---|---|
| 2010/0040782 A1* | 2/2010 | Arai et al. | ....................... | 427/256 |
| 2011/0050795 A1* | 3/2011 | Arai et al. | ....................... | 347/28 |
| 2011/0227992 A1 | 9/2011 | Matsumoto et al. | | |
| 2011/0234692 A1* | 9/2011 | Haijima et al. | ................. | 347/28 |
| 2013/0222501 A1* | 8/2013 | Kamada | ....................... | 347/102 |

FOREIGN PATENT DOCUMENTS

| | | |
|---|---|---|
| JP | 11-263022 | 9/1999 |
| JP | 2008-068569 | 3/2008 |
| JP | 4087822 B2 | 5/2008 |
| JP | 2011-68085 A | 4/2011 |
| JP | 2011-190414 | 9/2011 |

OTHER PUBLICATIONS

English language translation of the following: Office action dated Aug. 5, 2014 from the JPO in a Japanese patent application corresponding to the instant patent application. This office action translation is submitted now in order to supplement the understanding of patent document JPH11-263022, JP2011-190414 and JP2008-068569 which are cited in the office action and are being disclosed in the instant information Disclosure Statement.
Japanese Office Action dated May 12, 2015, in corresponding Japanese Patent Application No. 2012-218840.

* cited by examiner

*Primary Examiner* — Matthew Luu
*Assistant Examiner* — Rut Patel
(74) *Attorney, Agent, or Firm* — Solaris Intellectual Property Group, PLLC

(57) ABSTRACT

An ink set for inkjet recording includes: an ink composition including a pigment, a water-soluble polymerizable compound, and water; and a maintenance liquid that has a pH higher than 8.5 and that includes water and a water-soluble organic solvent having an SP value higher than 27.5 $MPa^{1/2}$, the amount of water contained in the maintenance liquid being 50% by mass or more with respect to the total amount of the maintenance liquid, the amount of water-soluble organic solvent contained in the maintenance liquid having an SP value higher than 27.5 $MPa^{1/2}$ being from 5 to 30% by mass with respect to the total amount of the maintenance liquid, and the amount of water-soluble organic solvent contained in the maintenance liquid having an SP value of 27.5 $MPa^{1/2}$ or lower being less than 5% by mass with respect to the total amount of the maintenance liquid.

18 Claims, No Drawings

INK SET FOR INKJET RECORDING AND IMAGE FORMING METHOD

CROSS-REFERENCE TO RELATED APPLICATION

This application claims priority under 35 USC 119 from Japanese Patent Application No. 2012-218840, filed Sep. 28, 2012, the disclosure of which is incorporated by reference herein in its entirety.

BACKGROUND OF THE INVENTION

1. Field of the Invention

The present invention relates to an ink set for inkjet recording and an image forming method.

2. Description of Related Art

A recording method utilizing an inkjet method is widely used since a high quality image can be recorded on a wide variety of recording media by, for example, ejecting ink droplets from multiple nozzle holes arranged on an inkjet head.

Components contained in an ink includes a colorant, and pigments are widely used as the colorant. Pigment inks become more viscous as solvent components contained in the inks evaporate, and gradually solidify. The pigment inks that have solidified hardly redissolve thereafter. Therefore, progression of thickening and solidification of a pigment ink causes gradual deposition of the pigment ink at, for example, a nozzle tip of an inkjet head, and resultantly causes narrowing and/or clogging of nozzle holes, and eventually causes failures such as a deviation of the direction in which the ink is ejected and inability to eject the ink. The progression of the adhesion and deposition of the pigment ink makes it difficult to maintain the ejection quality by using a nozzle cap, a wiping unit, or the like, thereby deteriorating image forming properties as time passes.

In view of this circumstance, a variety of studies concerning cleaning liquids (so-called maintenance liquids) used for cleaning or wiping of an inkjet recording head (so-called ejection head) or the like to which a pigment ink has attached are being conducted. A specific example of cleaning liquids known in the art is a cleaning liquid for an inkjet printer head disclosed in, for example, Japanese Patent No. 4,087,822. This cleaning liquid is intended to wash a non-aqueous photosensitive ink including a specific polymerizable compound, a photopolymerization initiator, and a pigment, and a difference in solubility parameter (SP value) between the cleaning liquid and the photosensitive ink is ±2($MPa^{1/2}$). Further, a maintenance liquid for removing a pigment-containing aqueous ink is known (see, for example, Japanese Patent Application Laid-Open (JP-A) No. 2011-68085) which has a pH of from 6.0 to 8.5 and which includes at least water, a water-soluble organic solvent having an SP value of 27.5 $MPa^{1/2}$ or lower, a basic compound, and an acidic compound.

SUMMARY OF THE INVENTION

Among the conventional cleaning techniques described above, the maintenance liquid described in JP-A No. 2011-68085 is intended to wash a pigment-containing aqueous ink. This aqueous ink is configured to include a large amount of polymer particles as a binder for the purpose of improving fixability to recording media. Therefore, solidification or deposition of the ink is likely to occur. In consideration of this issue, a solvent having a low SP value, which has high capacity to remove ink-derived solids, is selected. The use of a solvent having a low SP value is expected to exert a certain degree of effect in terms of achieving the ability to remove ink-derived solids, but also causes a problem in that a contact between the solvent and a pigment ink leads to aggregation of pigments in the pigment ink, and generation of aggregates.

Embodiments of the present invention include those described below.

<1> An ink set for inkjet recording, including:

an ink composition including a pigment, a water-soluble polymerizable compound, and water; and a maintenance liquid that has a pH higher than 8.5 and that includes water and a water-soluble organic solvent having an SP value higher than 27.5 $MPa^{1/2}$, the amount of water contained in the maintenance liquid being 50% by mass or more with respect to the total amount of the maintenance liquid, the amount of water-soluble organic solvent contained in the maintenance liquid having an SP value higher than 27.5 $MPa^{1/2}$ being from 5 to 30% by mass with respect to the total amount of the maintenance liquid, and the amount of water-soluble organic solvent contained in the maintenance liquid having an SP value of 27.5 $MPa^{1/2}$ or lower being less than 5% by mass with respect to the total amount of the maintenance liquid.

<2> The ink set for inkjet recording according to <1>, wherein the water-soluble organic solvent having an SP value higher than 27.5 $MPa^{1/2}$ is a polyhydric alcohol.

<3> The ink set for inkjet recording according to <1> or <2>, wherein the water-soluble organic solvent having an SP value higher than 27.5 $MPa^{1/2}$ is at least one polyhydric alcohol selected from the group consisting of ethyleneglycol, diethyleneglycol, propyleneglycol, glycerin, diglycerin, 1,4-butanediol, 1,5-pentanediol, and 1,6-hexanediol.

<4> The ink set for inkjet recording according to any one of <1> to <3>, wherein the maintenance liquid has a pH of from more than 8.5 to 10.0.

<5> The ink set for inkjet recording according to any one of <1> to <4>, wherein the amount of water-soluble organic solvent having an SP value higher than 27.5 $MPa^{1/2}$ is from 10 to 20% by mass with respect to the total amount of the maintenance liquid.

<6> The ink set for inkjet recording according to any one of <1> to <5>, wherein the maintenance liquid further includes a surfactant.

<7> The ink set for inkjet recording according to <6>, wherein the surfactant is a nonionic surfactant.

<8> The ink set for inkjet recording according to <7>, wherein the nonionic surfactant is an acetyleneglycol-based surfactant.

<9> The ink set for inkjet recording according to any one of <1> to <8>, wherein the ink set satisfies the following formula:

$$(A)/(B) \leq 1.1$$

wherein (A) represents a diameter of dispersed particles present when the maintenance liquid is added to the ink composition to dilute the ink composition 100-fold, and (B) represents a diameter of dispersed particles present in the ink composition before dilution.

<10> The ink set for inkjet recording according to any one of <1> to <9>, wherein the pigment is a polymer-coated pigment in which at least a part of a surface of the pigment is covered with a polymer.

<11> The ink set for inkjet recording according to any one of <1> to <10>, wherein the pigment is a polymer-coated pigment in which at least a part of a surface of the pigment is covered with a polymer by a phase inversion emulsification method.

<12> The ink set for inkjet recording according to any one of <1> to <11>, wherein the pigment is a polymer-coated pigment in which at least a part of a surface of the pigment is covered with a cross-linked polymer obtained by cross-linking a water-soluble dispersant using a cross-linking agent.

<13> The ink set for inkjet recording according to any one of <1> to <12>, wherein the water-soluble polymerizable compound is a compound having a (meth)acrylamide structure in a molecule thereof.

<14> The ink set for inkjet recording according to <4>, wherein the content of water-soluble organic solvent having an SP value higher than 27.5 MPa$^{1/2}$ is from 10 to 20% by mass with respect to the total amount of the maintenance liquid.

<15> The ink set for inkjet recording according to <14>, wherein the nonionic surfactant is an acetyleneglycol-based surfactant.

<16> The ink set for inkjet recording according to <15>, wherein the water-soluble polymerizable compound is a compound having a (meth)acrylamide structure in a molecule thereof.

<17> The ink set for inkjet recording according to <1>, wherein the water-soluble organic solvent having an SP value higher than 27.5 MPa$^{1/2}$ is selected from the group consisting of glycerin, diethylene glycol, and 1,5-pentanediol, when the maintenance liquid includes a water-soluble organic solvent having an SP value of 27.5 MPa$^{1/2}$ or lower, the water-soluble organic solvent having an SP value of 27.5 MPa$^{1/2}$ or lower is diethyleneglycol monobutyl ether, the amount of water contained in the maintenance liquid is from 69% by mass to 94% by mass with respect to the total amount of the maintenance liquid, the pigment contained in the ink composition is an encapsulated pigment or a self-dispersing pigment, the ink composition further includes a moisturizing agent and a surfactant, the water-soluble polymerizable compound contained in the ink composition includes hydroxyethyl acrylamide and the following Polymerizable Compound a, the total content of polymerizable compounds in the ink composition is from 15% by mass to 40% by mass with respect to the total amount of the ink composition, and the content of the pigment in the ink composition is from 1% by mass to 10% by mass with respect to the total amount of the ink composition, Polymerizable Compound a

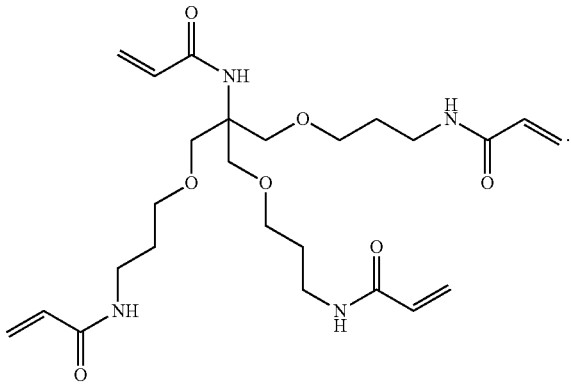

<18> An image forming method, including:

applying an ink composition to a recording medium by ejecting the ink composition from an inkjet recording head, the ink composition including a pigment, a water-soluble polymerizable compound, and water; and removing, using a maintenance liquid, any of the ink composition that has attached to the inkjet recording head, the maintenance liquid having a pH higher than 8.5 and including water and a water-soluble organic solvent having an SP value higher than 27.5 MPa$^{1/2}$, the amount of water contained in the maintenance liquid being 50% by mass or more with respect to the total amount of the maintenance liquid, the amount of water-soluble organic solvent contained in the maintenance liquid having an SP value higher than 27.5 MPa$^{1/2}$ being from 5 to 30% by mass with respect to the total amount of the maintenance liquid, and the amount of water-soluble organic solvent contained in the maintenance liquid having an SP value of 27.5 MPa$^{1/2}$ or lower being less than 5% by mass with respect to the total amount of the maintenance liquid.

DETAILED DESCRIPTION OF THE INVENTION

The scope of the term "maintenance" as used in the invention includes maintenance whereby an inkjet head for ejecting an inkjet recording ink composition and ejection quality thereof are maintained in a desired condition or a condition similar to the desired condition, as well as cleaning in which the condition of a recording head is improved by cleaning the recording head. The scope of the maintenance liquid includes a cleaning liquid for removing the ink composition.

In the invention, the capacity to remove an ink composition (for example, ink-derived solids) is also referred to as "maintenance capacity".

The term "compatibility with ejection head members" as used in the invention refers to properties that hardly deteriorate members of an ejection head, such as metal members constituting the ejection head and liquid repellent films provided on the nozzle plate of the ejection head, and that are suitable for use with the members.

In the present specification, any numerical range represented by using "from . . . to" means a range including the values before and after the "to" as the minimum value and the maximum value.

As used herein, the scope of the term "step" includes an independent step as well as a step which cannot be clearly separated from other steps but achieves the intended effect of the step of interest.

An ink set for inkjet recording, and an ink composition and a maintenance liquid which constitute the ink set for inkjet recording are described below in detail. However, the invention is by no means limited to the embodiments described below, and modifications may be made, as appropriate, when practicing the invention as long as the spirit of the invention is retained.

Ink Set For Inkjet Recording

The ink set for inkjet recording according to the invention (hereinafter sometimes referred to as "ink set") is configured to include an ink composition and a maintenance liquid, the ink composition including a pigment, a water-soluble polymerizable compound, and water, and the maintenance liquid having a pH higher than 8.5 and including water and a water-soluble organic solvent having an SP value higher than 27.5 MPa$^{1/2}$, the total amount of water contained in the maintenance liquid being 50% by mass or more with respect to the total amount of the maintenance liquid, the total amount of water-soluble organic solvent contained in the maintenance liquid having an SP value higher than 27.5 MPa$^{1/2}$ being from 5 to 30% by mass with respect to the total amount of the maintenance liquid, and the total amount of water-soluble organic solvent contained in the maintenance liquid having an SP value of 27.5 MPa$^{1/2}$ or lower being less than 5% by mass with respect to the total amount of the maintenance liquid.

When an image is formed by ejecting an ink from an inkjet recording head (hereinafter sometimes referred to as "head" or "ejection head"), fine particles of the ink in a mist form are generated during the ejection. When the fine particles of the ink attach to the ejection head, the ink dries on the head and solidifies, as a result of which granular solids (dry ink, hereinafter sometimes referred to as ink-derived solids) may deposit. In a case in which an ejection head is cleaned by applying a cleaning liquid, and in which the capacity of the cleaning liquid to remove dry ink particles (ink particles) that have attached to a surface of the head is not sufficient, solids such as undissolved ink particles remaining on the head are moved during wiping after the cleaning, thereby causing a phenomenon such as clogging of ejection holes due to entry of the solids into the ejection holes or concentrated distribution of the solids at or around the ejection holes. Such a phenomenon adversely affects ink ejection after cleaning of the head, and, as a result, ejection defects such as deviation of ink ejection direction or inability to eject occur. The ejection defects are particularly conspicuous in the case of an aqueous pigment ink that includes a large amount of polymer components in addition to the pigment.

In conventional techniques, when the pigment ink solidifies to cause clogging at an ejection section of the inkjet head, a low SP value solvent having high dissolving power has been used as a maintenance liquid. However, there is a problem in that when a solvent having a low SP value contacts the pigment ink, pigments in the pigment ink aggregate to form aggregates.

In contrast, in the present invention, an ink composition is configured to include at least a pigment, a water-soluble polymerizable compound, and water as components thereof, as a result of which the ink composition can be fixed to a recording medium by curing, and thus the ink composition does not need to include a large amount of polymer particles or the like as a binder. Therefore, residual components remaining after drying of the ink composition would be a water-soluble polymerizable compound having moisture retention properties or affinity and a pigment. Accordingly, the ink-derived solids can be sufficiently removed by cleaning without using a low SP value solvent having a high cleaning power as a maintenance liquid. Further, since low SP value solvents are not used in a large amount in a maintenance liquid, aggregation of the pigment, which may otherwise occur upon contacting of a maintenance liquid with a pigment ink, can be inhibited. Therefore, ink ejection quality can stably be maintained when the ink set according to the invention is used.

Nozzle plates of ejection heads are provided with liquid repellent films in order to improve switching between ejection and non-ejection of inks. When the liquid repellent films deteriorate, it becomes difficult to continuously maintain high ejecting accuracy. Therefore, the maintenance liquid preferably has properties which do not deteriorate members of ejection heads such as the liquid repellent films described above.

In the invention, deterioration of members of ejection heads such as the liquid repellent films can also be suppressed by selecting a specific water-soluble organic solvent and water as components of the maintenance liquid and setting the pH of the maintenance liquid to a specific value.

Ink Composition

The ink composition according to the invention includes at least a pigment, a water-soluble polymerizable compound, and water, and optionally further includes other components such as a polymerization initiator, a dispersant, or a surfactant, as necessary.

Pigment

The ink composition according to the invention includes at least one pigment.

In the invention, the pigment is not particularly limited, and may be appropriately selected in accordance with the purpose. For example, organic pigments or inorganic pigments known thus far may be used.

It is preferable that the pigment is almost insoluble in water or hardly soluble in water, from the viewpoint of achieving favorable ink coloring properties.

Examples of organic pigments include polycyclic pigments such as azo lakes, azo pigments, phthalocyanine pigments, perylene pigments, perynone pigments, anthraquinone pigments, quinacridone pigments, dioxazine pigments, diketopyrrolopyrrole pigments, thioindigo pigments, isoindolinone pigments, and quinophthalone pigments; dye lakes such as basic dye lakes and acidic dye lakes; nitro pigments; nitroso pigments; aniline black; and daylight fluorescent pigments. Examples of inorganic pigments include titanium oxide, iron oxide-based pigments, and carbon black-based pigments. Pigments that are not described in the Color Index may also be used so long as the pigments are dispersible in an aqueous phase.

Examples of usable pigments further include: pigments obtained by surface-treating the above-listed pigments with a surfactant, a polymeric dispersant, or the like; and grafted carbon.

Among these pigments, azo pigments, phthalocyanine pigments, anthraquinone pigments, quinacridone pigments, and carbon black-based pigments are particularly preferable.

The pigments may be used singly or in combination of two or more thereof.

The pigment contained in the ink composition according to the invention is preferably a water-dispersible pigment.

Examples of the water-dispersible pigment include pigments listed in the items (1) to (4) below.

(1) an encapsulated pigment; in other words, a polymer dispersion in which a pigment is contained in a polymer particle, more specific example of which include a pigment that is made dispersible in water by covering the pigment with a hydrophilic water-insoluble resin to form a resin layer on the surface of the pigment (2) a self-dispersing pigment; in other words, a pigment that has at least one kind of hydrophilic group on its surface and that exhibits at least one of water dispersibility or water solubility in the absence of a dispersant, more specific example of which include a pigment that is obtained by subjecting the surface of a pigment, typically carbon black or the like, to oxidation treatment whereby hydrophilicity is imparted, and that is dispersible in water by itself due to the imparted hydrophilicity (3) a resin-dispersed pigment; in other words, a pigment dispersed using a water-soluble polymeric compound having a weight-average molecular weight of 50,000 or less (4) a surfactant-dispersed pigment; in other words, a pigment dispersed using a surfactant The content of pigment in the ink composition according to the invention is preferably from 0.1 to 15% by mass, more preferably from 0.5 to 12% by mass, and particularly preferably from 1 to 10% by mass, with respect to the total mass of the ink composition, from the viewpoints of achieving a favorable color density, favorable granularity, and favorable stability of the ink composition, stability of ejection of the ink composition, and the like.

In the invention, among the water-dispersible pigments described above, encapsulated pigments and self-dispersing pigments are preferable, and encapsulated pigments are more preferable, from the viewpoints of facilitating removal of the ink composition by cleaning and suppressing generation of aggregates derived from the pigment in a case in which the pigment contacts the after-mentioned maintenance liquid.

(1) Encapsulated Pigment

The resin with which the pigment is covered is not limited. The resin is preferably a polymer compound having the ability to self-disperse or dissolve in a mixed solvent of water and a water-soluble organic solvent, and having an anionic group (acidic). In usual cases, the number average molecular weight of the resin is preferably in the range of from about 1,000 to about 100,000, and more preferably in the range of from about 3,000 to about 50,000. It is preferable that the resin dissolves in an organic solvent to form a solution. When the number average molecular weight of the resin is within the range described above, the resin is able to serve as a coating film for the pigment or as a coating film formed from an ink that contains the encapsulated pigment. The resin is preferably used in the form of an alkali metal salt or an organic amine salt.

Specific examples of the resin for the encapsulated pigment include a material having an anionic group, such as: an acrylic, epoxy-based, polyurethane-based, polyether-based, polyamide-based, unsaturated polyester-based, phenolic, silicone-based, or fluorine-based resin, each of which is thermoplastic, thermosetting, or modified; a polyvinyl-based resin such as vinyl chloride, vinyl acetate, polyvinyl alcohol, or polyvinyl butyral; a polyester-based resin such as an alkyd resin or a phthalic acid resin; an amino-based material such as a melamine resin, a melamine-formaldehyde resin, an aminoalkyd co-condensated resin, or a urea resin; or a copolymer or mixture thereof.

Among these resins, an anionic acrylic resin can be obtained by, for example, polymerizing, in a solvent, an acrylic monomer having an anionic group (hereinafter referred to as "anionic-group-containing acrylic monomer") and, if necessary, another monomer copolymerizable with the anionic group-containing acrylic monomer. Examples of the anionic-group-containing acrylic monomer include an acrylic monomer having one or more anionic groups selected from the group consisting of a carboxyl group, a sulfonic acid group, and a phosphonic acid group, of which an acrylic monomer having a carboxyl group is particularly preferable. Specific examples of the acrylic monomer having a carboxyl group include acrylic acid, methacrylic acid, crotonic acid, ethacrylic acid, propylacrylic acid, isopropylacrylic acid, itaconic acid, and fumaric acid. Among these, acrylic acid and methacrylic acid are preferable.

The encapsulated pigment can be produced by conventional physical or chemical methods, using the ingredients described above. In the invention, the encapsulated pigment can be produced, for example, by the methods disclosed in JP-A No. H09-151342, JP-A No. H10-140065, JP-A No. H11-209672, JP-A No. H11-172180, JP-A No. H10-25440, JP-A No. H11-43636, and the like. Specific examples of the methods include the phase inversion emulsification method and the acid precipitation method described in JP-A No. H09-151342 and JP-A No. H10-140065.

The phase inversion emulsification method is basically a self-dispersing (phase inversion emulsification) method in which a mixed composition of a pigment and a resin having self-dispersibility or solubility is dispersed in water. The mixed composition may include a curing agent or a polymer compound. Here, the scope of the term "mixed composition" encompasses a state in which ingredients are mixed but are not dissolved in each other, a state in which ingredients are mixed and dissolved in each other, or a state in which both of these two states are included.

The disclosures of JP-A No. H09-151342 and JP-A No. H10-140065 may be referenced with respect to more specific examples of the phase inversion emulsification method and the acid precipitation method.

Dispersant

The aqueous ink according to the invention may include at least one dispersant. The dispersant for a pigment may be either of a polymeric dispersant or a low molecular surfactant-type dispersant. The polymeric dispersant may be either of a water-soluble dispersant or a water-insoluble dispersant.

Here, the "water-insoluble" dispersant means a dispersant that exhibits a dissolution amount of 10 g or less when the dispersant is dissolved in 100 g of water at 25° C. after being dried at 105° C. for 2 hours.

The low-molecular surfactant-type dispersant is capable of stably dispersing a pigment in a water medium while maintaining a low viscosity of the ink. The low-molecular surfactant-type dispersant has a molecular weight of 2,000 or less, and the molecular weight of the low-molecular surfactant-type dispersant is preferably from 100 to 2,000, and more preferably from 200 to 2,000.

The low-molecular surfactant-type dispersant has a structure containing a hydrophilic group and a hydrophobic group. The low-molecular surfactant-type dispersant has at least one hydrophilic group and at least one hydrophobic group in one molecule thereof. In the low-molecular surfactant-type dispersant, the number of hydrophilic groups may be chosen independently from the number of hydrophobic groups. The low-molecular surfactant-type dispersant may have plural kinds of hydrophilic groups, and the low-molecular surfactant-type dispersant may have plural kinds of hydrophobic groups. The low-molecular surfactant-type dispersant may have a linking group for linking the hydrophilic group(s) and the hydrophobic group(s), as appropriate.

Examples of the hydrophilic group include an anionic group, a cationic group, a nonionic group, and a betaine-type structure in which an anionic group and a cationic group are contained in combination. The anionic group is not particularly limited so long as the group has a negative charge. The anionic group is preferably a phosphoric acid group, a phosphonic acid group, a phosphinic acid group, a sulfuric acid group, a sulfonic acid group, a sulfinic acid group, or a carboxyl group, more preferably a phosphoric acid group or a carboxyl group, and still more preferably a carboxyl group. The cationic group is not particularly limited so long as the group has a positive charge. The cationic group is preferably an organic cationic substituent, more preferably a nitrogen or phosphorus cationic group. The cationic group is more preferably a pyridinium cation or an ammonium cation. Examples of the nonionic group include polyethylene oxide, polyglycerin, and some kinds of sugar units.

The hydrophilic group is preferably an anionic group. The anionic group is preferably a phosphoric acid group, a phosphonic acid group, a phosphinic acid group, a sulfuric acid group, a sulfonic acid group, a sulfinic acid group, or a carboxylic acid group, more preferably a phosphoric acid group or a carboxylic acid group, and still more preferably a carboxylic acid group.

The hydrophobic group has, for example, a hydrocarbon-based structure, a fluorocarbon-based structure, or a silicone-based structure, and preferably has a hydrocarbon-based structure. The hydrophobic group may have either of a straight-chain structure or a branched structure. The hydrophobic group may have single chain structure or multiple chain structure. In a case in which the hydrophobic group has a structure having two or more chains, the hydrophobic group may include plural kinds of hydrophobic groups.

The hydrophobic group is preferably a hydrocarbon group having from 2 to 24 carbon atoms, more preferably a hydrocarbon group having from 4 to 24 carbon atoms, and still more preferably a hydrocarbon group having from 6 to 20 carbon atoms.

Among polymeric dispersants, examples of water-soluble dispersants include hydrophilic polymeric compounds. Examples of natural hydrophilic polymeric compounds that can be used as polymeric dispersants include plant polymers such as gum arabic, gum tragacanth, guar gum, gum karaya, locust bean gum, arabinogalactan, pectin, and quince seed starch, algae polymers such as alginic acid, carrageenan, and agar, animal polymers such as gelatin, casein, albumin, and collagen, and microbial polymers such as xanthene gum and dextran.

Examples of hydrophilic polymeric compounds that are obtained by modifying natural raw materials and that can be used as polymeric dispersants include: cellulose polymers such as methyl cellulose, ethyl cellulose, hydroxyethyl cellulose, hydroxypropyl cellulose, and carboxymethyl cellulose; starch polymers such as sodium starch glycolate and sodium starch phosphate; and algae polymers such as sodium alginate and propyleneglycol alginate.

Examples of synthetic hydrophilic polymeric compounds that can be used as polymeric dispersants include: vinyl polymers such as polyvinyl alcohol, polyvinyl pyrrolidone, and polyvinyl methyl ether; acrylic resins such as non-bridging polyacrylamide, polyacrylic acid or alkali metal salts thereof, and water-soluble styrene acrylic acid resins; water-soluble styrene maleic acid resins; water-soluble vinylnaphthalene acrylic resins; water-soluble vinylnaphthalene maleic acid resins; polyvinyl pyrrolidone; polyvinyl alcohol; alkali metal salts of formalin condensates of β-naphthalene sulfonic acid; polymeric compounds having, at a side chain thereof, a salt of a cationic functional group such as a quaternary ammonium group or an amino group; and natural polymeric compounds such as shellac.

Among these, polymeric compounds containing a carboxyl group are preferable from the viewpoint of achieving favorable dispersion stability of pigments. Polymer compounds containing a carboxyl group are particularly preferable, examples of which include water-soluble styrene maleic acid resins, water-soluble vinylnaphthalene acrylic resins, water-soluble vinylnaphthalene maleic acid resins, and acrylic resins such as water-soluble styrene acrylic resins.

Examples of water-insoluble dispersants that can be used as polymeric dispersants include a polymer having a hydrophilic portion and a hydrophobic portion, such as a copolymer of styrene and (meth)acrylic acid, a copolymer of styrene, (meth)acrylic acid, and a (meth)acrylic ester, a copolymer of a (meth)acrylic ester and (meth)acrylic acid, a copolymer of polyethyleneglycol (meth)acrylate and (meth)acrylic acid, a copolymer of vinyl acetate and maleic acid, and a copolymer of styrene and maleic acid.

The weight-average molecular weight of the polymeric dispersant is preferably from 3,000 to 200,000, more preferably from 5,000 to 100,000, still more preferably from 5,000 to 80,000, and particularly preferably from 10,000 to 60,000.

The ink composition according to the invention preferably includes a polymer having a carboxyl group as a polymeric dispersant, with a view to improving the dispersibility of the pigment. The ink composition more preferably includes, as a polymeric dispersant, a polymer having a carboxyl group and having an acid value of from 100 mgKOH/g or lower, more preferably from 25 to 100 mgKOH/g.

The mixing ratio by mass of pigment to dispersant (pigment:dispersant) is preferably in a range of from 1:0.06 to 1:3, more preferably in a range of from 1:0.125 to 1:2, and still more preferably in a range of from 1:0.125 to 1:1.5.

In the invention, a resin-coated pigment in which a pigment is coated with a cross-linked polymer obtained by cross-linking a water-soluble resin (hereinafter also referred to as "water-soluble polymer") using a cross-linking agent is more preferable from the viewpoint of facilitating removal of ink-derived solids by cleaning and suppressing generation of pigment-derived aggregates upon contacting of the pigment with the maintenance liquid described below.

Here, the "water-soluble" resin or polymer means a polymer that exhibits a solubility in distilled water at 25° C. of 2% by mass or higher, and the solubility is more preferably 5% by mass or higher, and still more preferably 10% by mass or higher. When the polymer has salt-forming groups, the polymer preferably has a solubility within the range described above in a state in which the salt-forming groups of the polymer are neutralized using an equivalent amount of base or acid.

The water-soluble polymer serves as a dispersant for dispersing the pigment. In a case in which the pigment is coated with a cross-linked water-soluble polymer, a dispersion of the pigment, or an aqueous ink prepared using the pigment dispersion, has excellent stability (stability against pH change, stability against temperature change). Examples of the water-soluble polymer include polyvinyls, polyurethanes, and polyesters. Among these, polyvinyls are preferable.

The water-soluble polymer has, in a molecule thereof, a group that undergoes a cross-linking reaction with a cross-linking agent. The group is not particularly limited, and examples thereof include a carboxyl group or a salt thereof, an isocyanate group, and an epoxy group. In the invention, the polymer preferably has a carboxyl group or a salt thereof, from the viewpoint of improving the dispersibility of the pigment.

The water-soluble polymer is preferably a copolymer obtained using a carboxyl group-containing monomer as a copolymerization component. Examples of the carboxyl group-containing monomer include methacrylic acid, β-carboxyethyl acrylate, fumaric acid, itaconic acid, maleic acid, and crotonic acid. Among these, methacrylic acid and β-carboxyethyl acrylate are preferable from the viewpoints of achieving a favorable cross-linkability of the water-soluble polymer and favorable dispersion stability of the ink composition. Other than the carboxyl group-containing monomer, a hydrophilic monomer and/or a hydrophobic monomer, which may be freely selected, may be used as a copolymerization component. The hydrophilic monomer may be ionic or nonionic. The hydrophobic monomer is not particularly restricted, and is preferably an alkyl methacrylate having from 1 to 20 carbon atoms or an alkyl acrylate having from 1 to 20 carbon atoms.

The water-soluble polymer may be any of a random polymer, a block copolymer, or a graft polymer.

The acid value of the water-soluble polymer (the number of milligrams of KOH necessary for neutralizing 1 g of the water-soluble polymer) is preferably from 135 to 250 mgKOH/g, more preferably from 135 to 200 mgKOH/g, and particularly preferably from 135 to 180 mgKOH/g, from the viewpoints of achieving favorable dispersibility and favorable dispersion stability of the pigment.

The method for synthesizing the water-soluble polymer is not particularly restricted, and random polymerization of a vinyl monomer is preferable from the viewpoint of achieving favorable dispersion stability of the pigment.

A compound having two or more sites for carrying out a cross-linking reaction may be used as a cross-linking agent. In particular, a bi- or higher-functional epoxy compound is preferable due to its high reactivity with a carboxyl group. Specific examples of the bi- or higher-functional epoxy compound include ethyleneglycol diglycidyl ether, polyethyleneglycol diglycidyl ether, 1,6-hexanediol glycidyl ether, diethyleneglycol diglycidyl ether, polyethyleneglycol diglycidyl ether, dipropyreneglycol diglycidyl ether, and polypropyleneglycol diglycidyl ether. Polypropyleneglycol diglycidyl ether and diethyleneglycol diglycidyl ether are preferable.

The molar ratio of the cross-linking sites of the cross-linking agent to the cross-linkable sites of the water-soluble polymer is preferably from 1:1.1 to 1:10, more preferably from 1:1.1 to 1:5, and still more preferably from 1:1.1 to 1:3, from the viewpoints of achieving a favorable speed of the cross-linking reaction and favorable stability of the dispersion liquid after cross-linking The amount of the water-soluble polymer relative to the pigment is preferably from 10% by mass to 250% by mass, more preferably from 10% by mass to 200% by mass, further preferably from 20% by mass to 150% by mass, and particularly preferably from 30% by mass to 100% by mass.

A resin-coated pigment in which the surface of a pigment is coated with a cross-linked polymer formed by cross-linking a water-soluble polymer with a cross-linking agent can be obtained through steps including dispersing a pigment using the water-soluble polymer and then carrying out cross-linking using the cross-linking agent. A method including the following steps (1) to (3) is an example of preferable preparation methods.

(1) a dispersing step of obtaining a pigment dispersion liquid by dispersing a pigment and a water-soluble polymer in water or in an aqueous solution of a polar solvent (2) a cross-linking step of coating the surface of the pigment with a cross-linked polymer by causing a cross-linking reaction by adding a cross-linking agent to the pigment dispersion liquid obtained in the step (1)

(3) a step of purifying the resin-coated pigment coated with the cross-linked polymer Steps other than the steps described above may be provided, as necessary. A known polar solvent or the like may be appropriately used as the polar solvent or the like used in the step (1).

Specific examples of pigments that are coated with a cross-linked polymer formed by cross-linking a water-soluble polymer with a cross-linking agent and that can be suitably used include PROJET YELLOW APD1000, PROJET MAGENTA APD1000, PROJET CYAN APD1000, and PROJET BLACK APD1000 (all manufactured by FUJIFILM Imaging Colorants, Inc.).

The average particle diameter of the pigment in the dispersed state is preferably from 10 nm to 200 nm, more preferably from 10 nm to 150 nm, and still more preferably from 10 nm to 100 nm. With an average particle diameter of 200 nm or less, excellent color reproducibility is obtained, and excellent ejecting properties are obtained at the time of ejecting droplets using an inkjet method. With an average particle diameter of 10 nm or more, excellent light-fastness is obtained. The particle size distribution of the colorant is not particularly limited, and may be a broad particle size distribution or a monodisperse particle size distribution. It is also possible to use a mixture of two or more colorants each having a monodisperse particle size distribution.

Here, the average particle diameter of the pigment in the dispersed state refers to an average particle diameter in the state of being contained in an ink; the same shall apply to a so-called "concentrated ink dispersion" prepared in a stage prior to ink formation.

The average particle diameter of the pigment in the dispersed state and the average particle diameter and particle size distribution of the after-mentioned polymer particles are obtained by measuring a volume average particle diameter according to a dynamic light scattering method using a Nanotrac particle size distribution measuring instrument UPA-EX150 (manufactured by NIKKISO Co., Ltd.).

(2) Self-Dispersing Pigment

In the invention, a self-dispersing pigment is also a preferable example. The self-dispersing pigment is a pigment in which a large number of hydrophilic functional groups and/or salts thereof (hereinafter referred to as "dispersibility imparting groups") are bonded to the surface of a pigment directly or indirectly via an alkyl group, an alkyl ether group, an aryl group, or the like, the self-dispersing pigment being able to disperse in an aqueous medium without using a dispersant for dispersing the pigment. Here, the expression "able to disperse in an aqueous medium without using a dispersant" means that the pigment can disperse in an aqueous medium even when a dispersant for dispersing the pigment is not used.

An ink including a self-dispersing pigment as a colorant does not need to include a dispersant, which is usually contained in order to disperse pigments. Therefore, an ink in which foaming due to a decrease in defoaming property caused by dispersants hardly occurs, and which has excellent ejection stability can easily be prepared.

Examples of dispersibility imparting groups bonded to the surface of the self-dispersing pigment include —COOH, —CO, —OH, —$SO_3H$, —$PO_3H_2$, and quaternary ammonium, and salts thereof. The dispersibility imparting groups are bonded to the surface of a pigment by applying physical treatment or chemical treatment to the pigment, thereby bonding (grafting) the dispersibility imparting groups or active species having a dispersibility imparting group to the surface of the pigment. The physical treatment may be, for example, vacuum plasma treatment. Examples of the chemical treatment include a wet oxidation method of oxidizing the surface of a pigment in water using an oxidizing agent, and a method of bonding a carboxyl group to the surface of a pigment via a phenyl group by bonding p-aminobenzoic acid to the surface of the pigment.

A preferable example of the self-dispersing pigment in the invention is a self-dispersing pigment surface treated by oxidation treatment with a hypohalous acid and/or a hypohalite, or by oxidation treatment with ozone. Commercially available products may be used as self-dispersing pigments, examples of which include MICROJET CW-1 (trade name; manufactured by Orient Chemical Industries, Ltd.), and CAB-O-JET200 and CAB-O-JET300 (trade name; manufactured by Cabot Corp.).

(3) Resin Dispersed Pigment

Other than the encapsulated pigment described above, a pigment dispersed using a water-insoluble resin can alternatively be produced, for example, by dispersing a pigment using a water-insoluble resin as a dispersant, thereby preparing a pigment dispersion.

This method allows a pigment particle to have a small particle size, and the pigment after being dispersed has high dispersion stability. In this method, it is not essential that the entire surface of the particle of the pigment be coated with a water-insoluble resin, and the pigment may be in a state in which at least part of the surface of the particle thereof is coated with a water-insoluble resin, depending on cases.

The preparation of the pigment dispersion can be carried out using, for example, a phase inversion emulsification method as described above. Specifically, the pigment dispersion can be prepared by mixing the pigment, the water-insoluble resin as a dispersant, water, and a water-insoluble volatile solvent, carrying out dispersing to obtain a dispersion, and removing the water-insoluble volatile solvent from the obtained dispersion. In this process, a basic compound may added to neutralize some or all of the anionic groups of the water-insoluble resin. The adjustment of the neutralization condition allows excellent dispersibility to be realized.

Examples of the basic compound include sodium hydroxide.

Examples of the water-insoluble volatile solvent include ketone solvents (such as methyl ethyl ketone and diethyl ketone) and ether solvents (such as dibutyl ether).

Further, an alkylene oxide adduct of glycerin may be added together with the water-insoluble volatile solvent.

The dispersing may be carried out after the desired components are mixed, by using known methods for stirring, dispersing, or the like, or by using mixing-stirring apparatuses, dispersing machines, or the like. The dispersing can be carried out by using, for example, a ball mill, a roll mill, a bead mill, a high-pressure homogenizer, a high-speed stirring disperser, an ultrasonic homogenizer, or the like.

Water-Soluble Polymerizable Compound

The ink composition according to the invention includes at least one water-soluble polymerizable compound having at least one type of polymerizable group, from the viewpoints of, for example, achieving a favorable strength of a formed image, favorable adhesiveness of a formed image to recording media, or favorable coagulation properties of the ink composition.

The term "water-soluble" mentioned above means the ability to dissolve in water at or more than a certain concentration. Specifically, being water-soluble means a solubility in water at 25° C. of 10% by mass or higher, preferably 15% by mass or higher. The water-soluble polymerizable compound is preferably able to dissolve in the ink composition (desirably, uniformly). The water-soluble polymerizable compound may also be a compound that dissolves in the ink composition (desirably, uniformly) due to an increased solubility caused by addition of the after-mentioned water-soluble organic solvent.

The total content of the polymerizable compound is preferably from 5 to 40% by mass, more preferably from 10 to 40% by mass, further preferably from 15 to 40% by mass, and particularly preferably from 20 to 35% by mass, with respect to the total mass of the ink composition.

With a total content of the polymerizable compound of 5% by mass or higher, the image strength and adhesiveness to recording media are further improved. With a total content of the polymerizable compound of 40% by mass or less, a step (pile height) of an image is decreased, and the scratch resistance and gloss of the image are further improved.

The polymerizable compound may be contained singly, or in combination of two or more thereof.

The polymerizable compound is not particularly limited, and, for example, a compound having an ethylenic double bond in a molecule thereof may be used.

More specifically, examples of the polymerizable compound include a compound having a (meth)acrylamide structure in a molecule thereof, a compound having a (meth)acrylic ester structure in a molecule thereof, an epoxy monomer, and an oxetane monomer.

Here, the (meth)acrylic ester structure means at least one of a methacrylic ester structure or an acrylic ester structure, and the (meth)acrylamide structure means at least one of a methacrylamide structure or an acrylamide structure.

Examples of the compound having a (meth)acrylic ester structure in a molecule thereof include a (meth)acrylic ester of a polyhydric alcohol, a (meth)acrylic ester of a glycidylether of a polyhydric alcohol, a (meth)acrylic ester of polyethyleneglycol, a (meth)acrylic acid ester of an ethylene oxide adduct of a polyhydric alcohol, and a UV-curable monomer or oligomer such as a reaction product of a polybasic acid anhydride and a hydroxyl-group-containing (meth) acrylic ester. The polyhydric alcohol may be a polyhydric alcohol having, in a molecule thereof, an extended chain formed of an ethylene oxide chain generated by addition of ethylene oxide.

In the invention, the polymerizable compound is preferably a compound having a (meth)acrylamide structure in a molecule thereof, from the viewpoint of further improving coagulation properties of the ink.

Examples of the compound having a (meth)acrylamide structure in a molecule thereof include a compound represented by the following Formula (1).

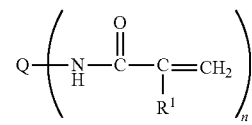

Formula (1)

The compound represented by Formula (1) is a compound in which an unsaturated vinyl monomer is bonded to group Q via an amide bond. $R^1$ represents a hydrogen atom or a methyl group, and preferably represents a hydrogen atom. Further, n, which is the valence of group Q, represents an integer of 1 or more, and, in particular, preferably represents an integer from 1 to 6, and more preferably from 1 to 4, from the viewpoint of improving the penetration properties of the ink composition into recording media, the polymerization efficiency of the polymerizable compound, and the stability of ejection of the ink composition. In consideration of an advantage in terms of achieving favorable penetration properties into a coating layer of a coated paper in a case in which a coated paper is used as a recording medium, the ink composition preferably includes a monofunctional acrylamide in which n represents 1, and more preferably includes a monofunctional acrylamide such that the content of monofunctional acrylamide is 10% by mass or more with respect to the total mass of the ink composition. It is preferable to use a monofunctional (meth)acrylamide in which n represents 1, having excellent penetration properties, and a multifunctional (meth)acrylamide in which n represents 2 or greater, providing excellent polymerization efficiency, in combination.

Monofunctional (meth)acrylamides in which n represents 1 are preferable in that the penetration properties into a pigment layer (coating layer) is high in a case in which a coated paper is used as a recording medium. In a case in which the ink composition includes a monofunctional (meth)acrylamide, the content of monofunctional acrylamide in the ink composition is preferably from 5 to 30% by mass, and more preferably from 10 to 20% by mass, with respect to the total mass of the ink composition.

Multifunctional (meth)acrylamides in which n is equal to or greater than 2 are preferable in that they improve polymerizability or polymerization efficiency when an image is cured by, for example, ultraviolet irradiation, thereby improving the abrasion resistance and scratch resistance of an image. When the ink composition includes a multifunctional (meth)acrylamide, the content of multifunctional (meth)acrylamide in the ink composition is preferably from 3 to 20% by mass, and more preferably from 5 to 15% by mass, with respect to the total mass of the ink composition.

In the multifunctional (meth)acrylamide, n is preferably from 2 to 6, and more preferably from 2 to 4, from the viewpoint of achieving both of the solubility and the curability of the multifunctional (meth)acrylamide.

Group Q in Formula (1) in which n represents 1 is not particularly restricted as long as the group is a monovalent group that can be connected to a (meth)acrylamide structure. Group Q when n represents 1 is preferably selected from water-soluble groups. Specific examples thereof include a monovalent residue obtained by removing one or more hydrogen atoms or hydroxyl groups from a compound selected from the following compound group X.

Compound Group X: polyol compounds such as ethyleneglycol, diethyleneglycol, triethyleneglycol, polyethyleneglycol, propyleneglycol, dipropyleneglycol, tripropyleneglycol, polypropyleneglycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thioglycol, trimethylolpropane, ditrimethylolpropane, trimethylolethane, ditrimethylolethane, neopentylglycol, pentaerythritol, dipentaerythritol, condensates thereof, low molecular polyvinyl alcohols, or sugars; and polyamine compounds such as ethylene diamine, diethylene triamine, triethylene tetramine, polyethylene imine, or polypropylene diamine.

Examples of group Q when n represents 2 include a substituted or unsubstituted alkylene group having 4 or fewer carbon atoms such as a methylene, ethylene, propylene, or butylene group, a divalent or higher-valent linking group having a saturated or unsaturated heterocycle (such as a pyridine ring, an imidazole ring, a pyrazine ring, a piperidine ring, a piperazine ring, or a morpholine ring), and a divalent or higher-valent residue of a polyol compound containing an oxyalkylene group (preferably, an oxyethylene group), and a divalent or higher-valent residue of a polyol compound containing three or more oxyalkylene groups (preferably, an oxyethylene group).

Specific examples of the (meth)acrylamide having a (meth)acrylamide structure in a molecule thereof include, but are not limited to, those described below.

Polymerizable Compound 1

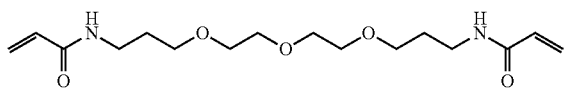

Polymerizable Compound 2

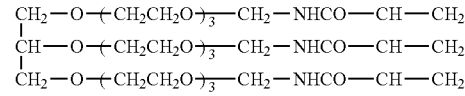

Polymerizable Compound 3

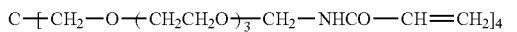

Polymerizable Compound 4

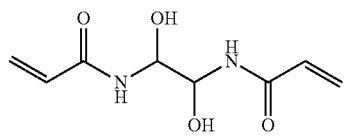

Polymerizable Compound 5

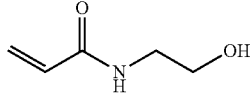

Polymerizable Compound 6

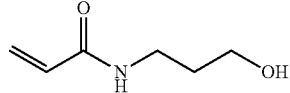

Polymerizable Compound 7

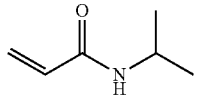

Polymerizable Compound 8

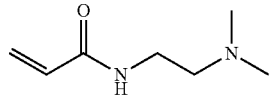

Polymerizable Compound 9

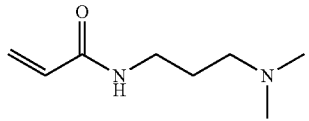

Polymerizable Compound 10

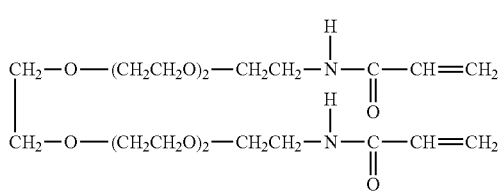

-continued
Polymerizable Compound 11
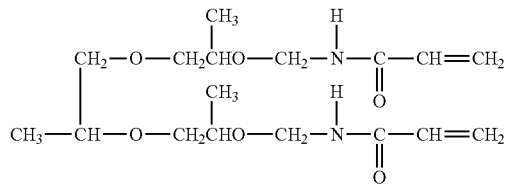
Polymerizable Compound 12
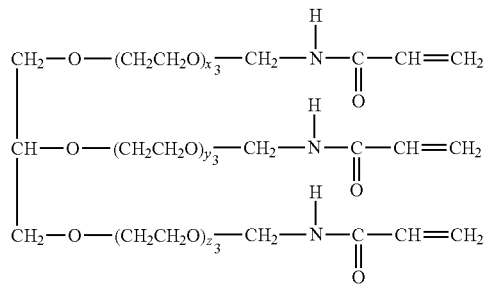
$x_3 + y_3 + z_3 = 6$
Polymerizable Compound 13
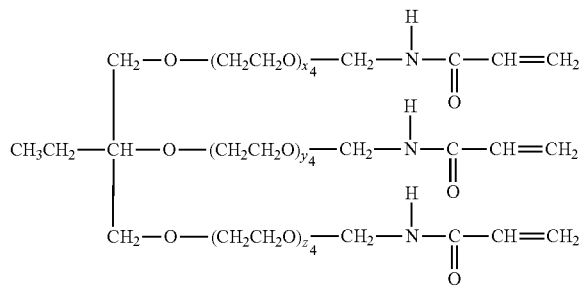
$x_4 + y_4 + z_4 = 9$
Polymerizable Compound 14
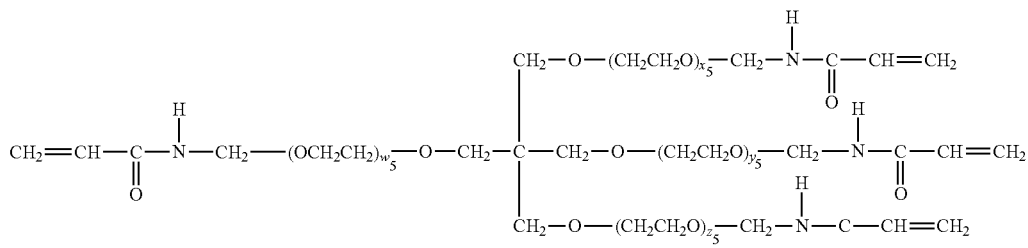
$w_5 + x_5 + y_5 + z_5 = 6$
Polymerizable Compound 15
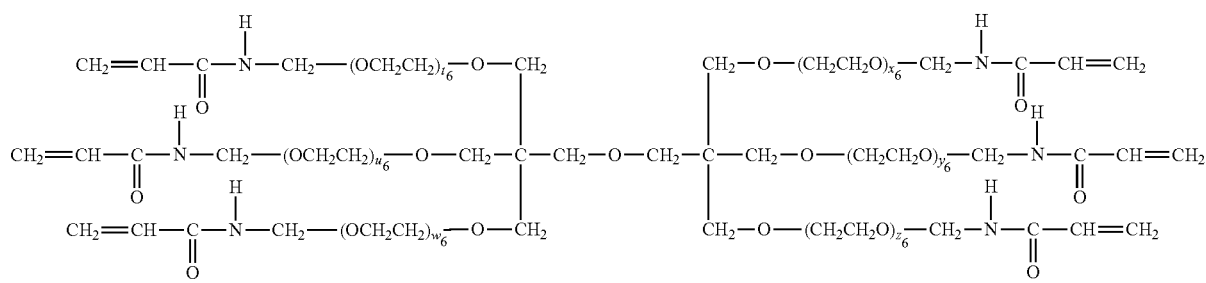
$t_6 + u_6 + w_6 + x_6 + y_6 + z_6 = 12$
Polymerizable Compound 16
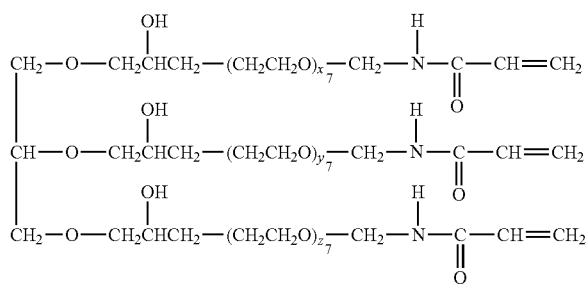
$x_7 + y_7 + z_7 = 3$ -continued

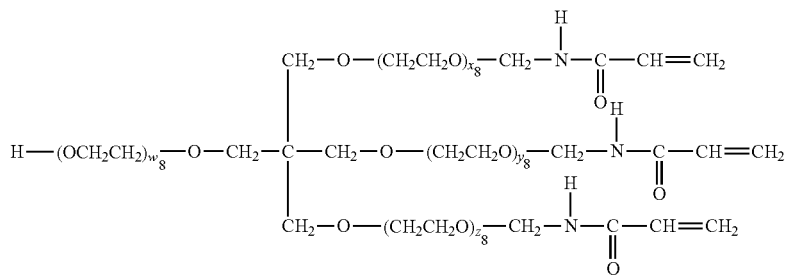

Polymerizable Compound 17

$w_8 + x_8 + y_8 + z_8 = 6$

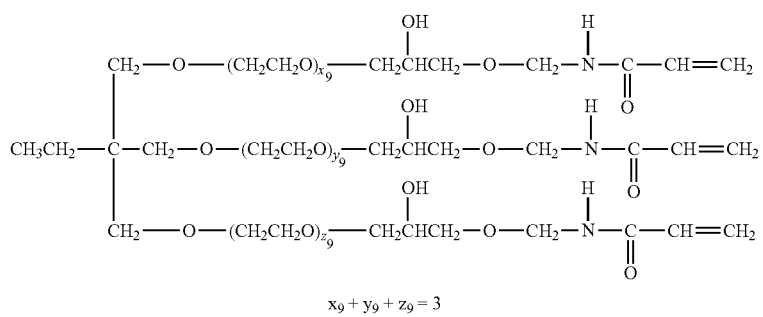

Polymerizable Compound 18

$x_9 + y_9 + z_9 = 3$

The multifunctional (meth)acrylamide is preferably a compound represented by Formula (2) shown below since the compound has high polymerizability and curability. The compound has four acrylamide groups or methacrylamide groups as polymerizable groups in a molecule thereof. The compound exhibits curability due to a polymerization reaction caused by application of energy, for example, an active energy radiation such as α-ray, γ-ray, X-ray, ultraviolet light, visible light, infrared light, or electron beam, or heat. The compound represented by Formula (2) exhibits solubility in water, and dissolves well in a water-soluble organic solvent such as water or an alcohol.

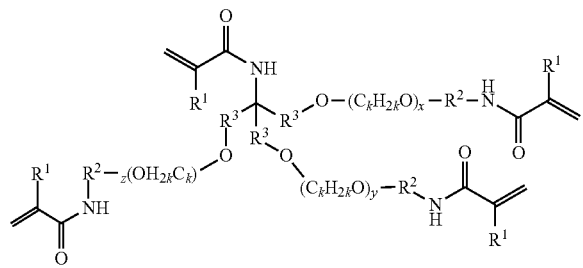

Formula (2)

In Formula (2), $R^1$ represents a hydrogen atom or a methyl group, and preferably represents a hydrogen atom. Plural $R^1$s may be the same as or different from one another.

$R^2$ represents a straight chain or branched alkylene group having from 2 to 4 carbon atoms. Plural $R^2$s may be the same as or different from one another. $R^2$ is preferably an alkylene group having from 3 to 4 carbon atoms, more preferably an alkylene group having 3 carbon atoms, and particularly preferably a straight chain alkylene group having 3 carbon atoms. The alkylene group represented by $R^2$ may itself have a substituent, and examples of the substituent include an aryl group and an alkoxy group.

Here, $R^2$ does not have a structure in which the oxygen atom and the nitrogen atom bonded to both ends of $R^2$ are bonded to the same carbon atom of $R^2$. $R^2$ is a straight chain or branched alkylene group that connects an oxygen atom and the nitrogen atom of a (meth)acrylamide group. When the alkylene group has a branched structure, although it is possible that the nitrogen atom of the (meth)acrylamide group and the oxygen atom, which are located at respective ends of the alkylene group, are connected to the same carbon atom in the alkylene group and form a —O—C—N-structure (hemiaminal structure), compounds having this structure are excluded from the scope of compounds represented by Formula (2). In compounds having an —O—C—N-structure in a molecule thereof, decomposition easily occurs at the carbon atom position. Those compounds are not preferable since those compounds are easily decomposed during storage, and cause a decrease in storage stability when those compounds are contained in the ink composition.

$R^3$ represents a divalent linking group. Examples of the divalent linking group represented by $R^3$ include an alkylene group, an arylene group, a heterocyclic group, and a group composed of any combination of these groups. The divalent linking group is preferably an alkylene group. When the divalent linking group includes an alkylene group, the alkylene group may further include at least one type of group selected from the group consisting of —O—, —S—, and —NR$^a$—. Here, R$^a$ represents a hydrogen atom or an alkyl group having from 1 to 4 carbon atoms.

When $R^3$ includes an alkylene group, examples of the alkylene group include a methylene group, an ethylene group, a propylene group, a butylene group, a pentylene group, a hexylene group, a heptylene group, an octylene group, and a nonylene group. The number of carbon atoms contained in the alkylene group of $R^3$ is preferably from 1 to 6, more preferably from 1 to 3, and particularly preferably 1. The alkylene group of $R^3$ may further include at least one type selected from the group consisting of —O—, —S—, and —NR$^a$—. Examples of alkylene groups containing —O— include —C$_2$H$_4$—O—C$_2$H$_4$— and —C$_3$H$_6$—O—C$_3$H$_6$—. The alkylene group of R$^3$ may further include a substituent, and examples of the substituent include an aryl group and an alkoxy group.

When R$^3$ includes an arylene group, examples of the arylene group include a phenylene group and a naphthylene group. The number of carbons contained in the arylene group of R$^3$ is preferably from 6 to 14, more preferably from 6 to 10, and particularly preferably 6. The arylene group of R$^3$ may further include a substituent, and examples of the substituent include an alkyl group and an alkoxy group.

When R$^3$ includes a heterocyclic group, the heterocyclic group is preferably a five-membered or six-membered ring, which may be fused with another ring. The heterocycle may be an aromatic heterocycle or a non-aromatic heterocycle. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzoisothiazole, thiadiazole, isoxazole, benzisoxazole, pyrrolidine, piperidine, piperazine, imidazolidine, and thiazoline. Among these, aromatic heterocyclic groups are preferable, and pyridine, pyrazine, pyrimidine, pyridazine, triazine, pyrazole, imidazole, benzimidazole, triazole, thiazole, benzothiazole, isothiazole, benzoisothiazole, and thiadiazole are preferable. The heterocyclic groups listed above are described as examples in which substitution positions are omitted, and the substitution positions are not limited. For example, pyridine can be substituted at at least one of 2-, 3-, or 4-position, and all of these substitution position variants are included in the scope of the invention.

The heterocyclic group may further include a substituent, and examples of the substituent include an alkyl group, an aryl group, and an alkoxy group.

In Formula (2), k represents 2 or 3. Plural k's may be the same as or different from one another. Further, C$_k$H$_{2k}$ may have a straight chain structure or a branched structure.

In Formula (2), x, y and z each independently represents an integer of from 0 to 6, preferably an integer of from 0 to 5, and more preferably an integer of from 0 to 3. Further, x+y+z is from 0 to 18, preferably from 0 to 15, and more preferably from 0 to 9.

Specific examples of the compound represented by Formula (2) include, but are not limited to, those shown below.

Polymerizable Compound a

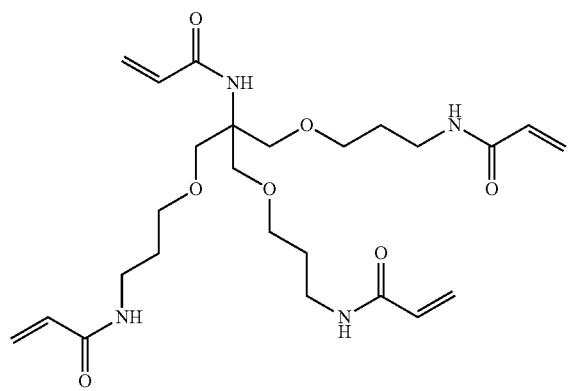

Polymerizable Compound b

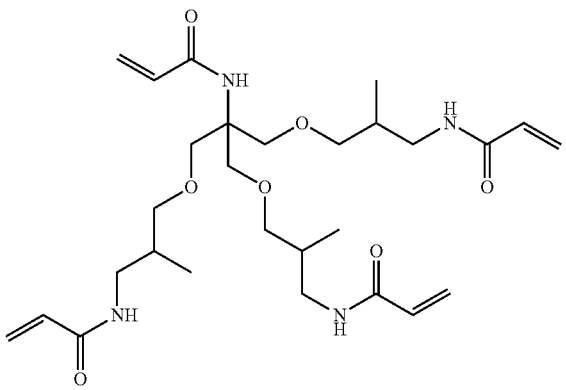

Polymerizable Compound c

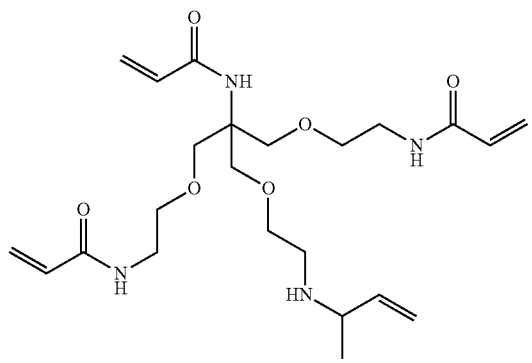

Polymerizable Compound d

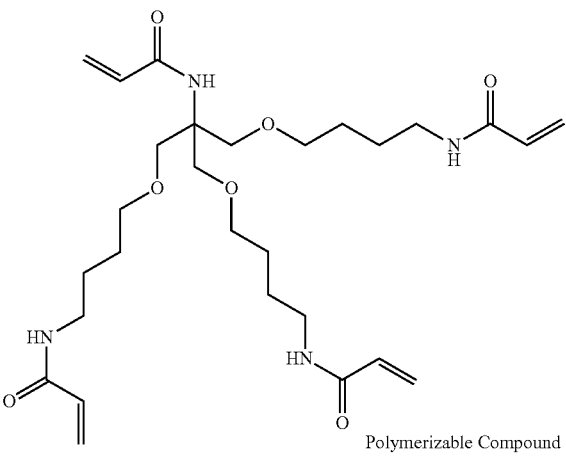

Polymerizable Compound e

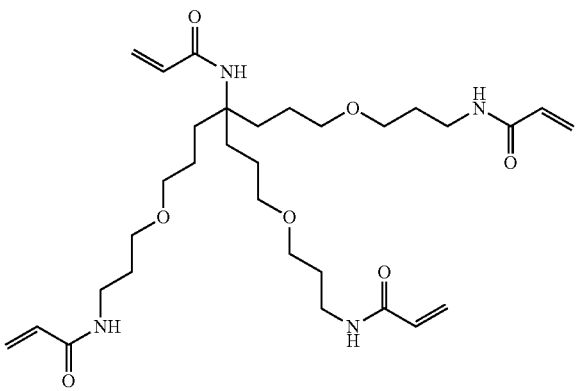

Polymerizable Compound f

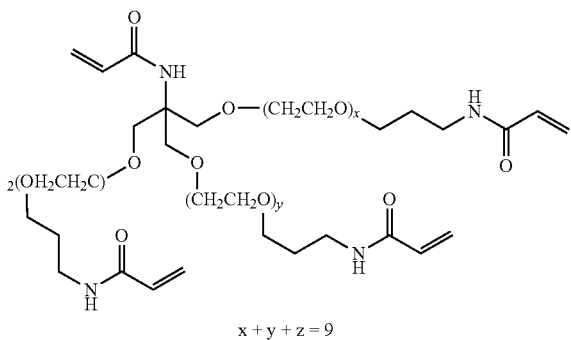

x + y + z = 9

The compound represented by Formula (2) can be produced according to, for example, Scheme 1 or Scheme 2 illustrated below:

(hydroxymethyl)aminomethane. The reaction in this step is carried out preferably at a temperature of from 3 to 60° C. for from 2 to 8 hours.

The second step is a step in which the polycyno compound is reacted with hydrogen in the presence of a catalyst so as to obtain a polyamine compound through a reduction reaction. The reaction in this step is carried out preferably at a temperature of from 20 to 60° C. for from 5 to 16 hours.

The third step is a step in which a multifunctional acrylamide compound is obtained by an acylation reaction of the polyamine compound and acrylic acid chloride or methacrylic acid chloride. The reaction in this step is carried out preferably at a temperature of from 3 to 25° C. for from 1 to 5 hours. Diacrylic acid anhydride or dimethacrylic acid anhydride may be used as the acylating agent in place of acid chloride. When both of acrylic acid chloride and methacrylic acid chloride are used in the acylating step, a compound having an acrylamide group and a methacrylamide group in the same molecule can be obtained as a final product.

Scheme 1

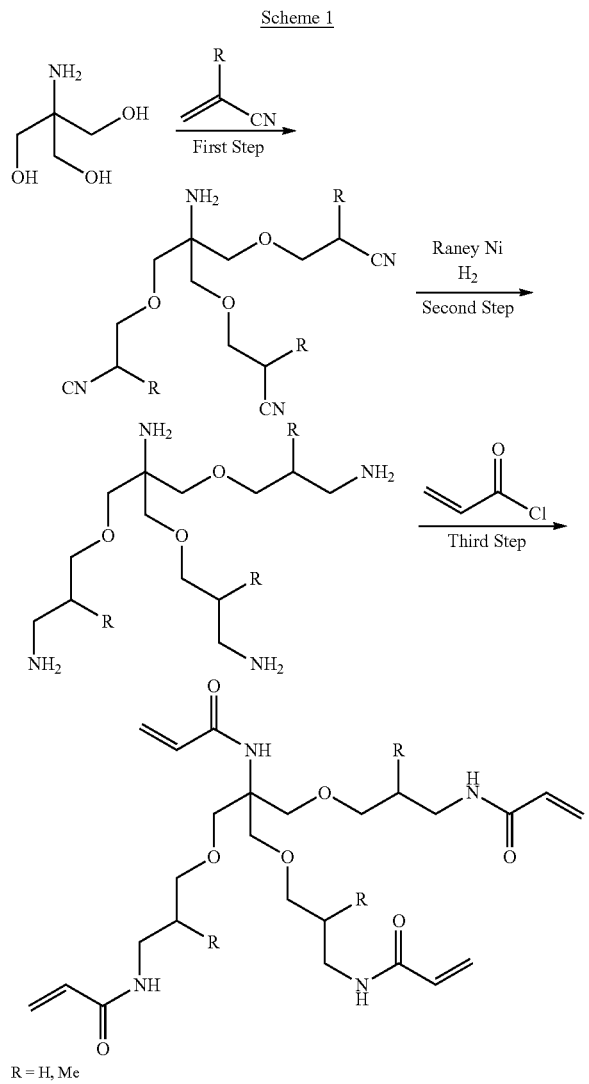

R = H, Me

Scheme 2

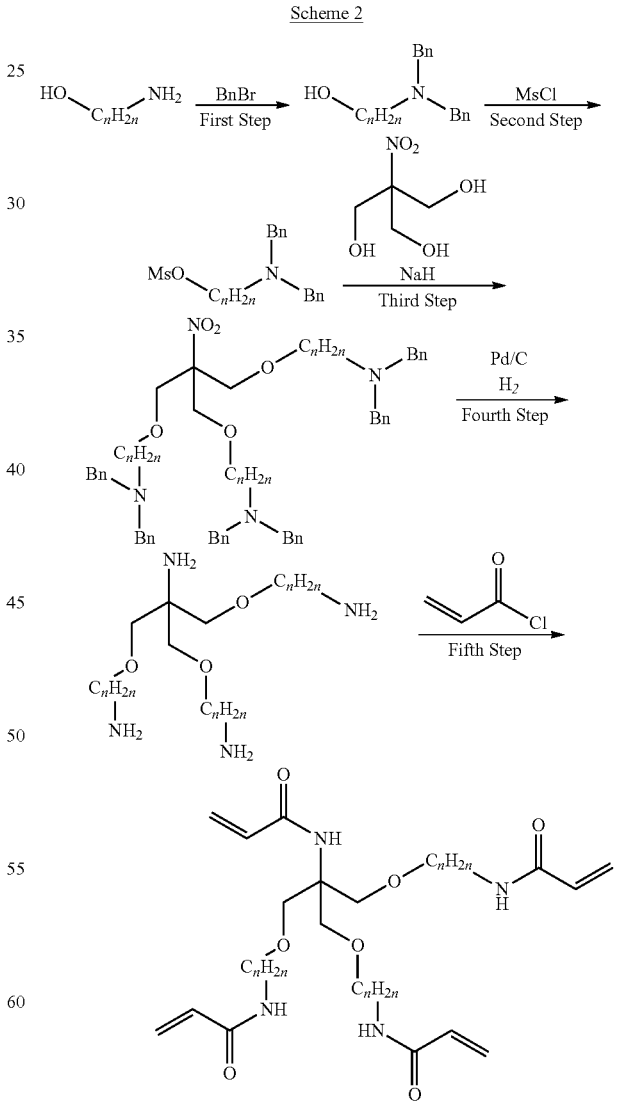

In Scheme 1, the first step is a step in which a polycyno compound is obtained by a reaction of acrylonitrile and tris In Scheme 2, the first step is a step in which a nitrogen-protected amino alcohol compound is obtained by a reaction of introducing a protective group, such as a benzyl group or a benzyloxycarbonyl group, to a nitrogen atom of an amino alcohol. The reaction in this step is carried out preferably at a temperature of from 3 to 25° C. for from 3 to 5 hours.

The second step is a step in which a leaving group, such as a methanesulfonyl group or a p-toluene sulfonyl group, is introduced to the OH group of the nitrogen-protected amino alcohol compound, so as to obtain a sulfonyl compound. The reaction in this step is carried out preferably at a temperature of from 3 to 25° C. for from 2 to 5 hours.

The third step is a step in which an amino alcohol adduct is obtained by a $S_N2$ reaction of the sulfonyl compound and a tris(hydroxymethyl)nitromethane. The reaction in this step is carried out preferable at a temperature of from 3 to 70° C. for from 5 to 10 hours.

The fourth step is a step in which the amino alcohol adduct is reacted with hydrogen in the presence of a catalyst so as to obtain a polyamine compound through a hydrogenation reaction. The reaction in this step is carried out preferably at a temperature of from 20 to 60° C. for from 5 to 16 hours.

The fifth step is a step in which a multifunctional acrylamide compound is obtained by an acylation reaction of the polyamine compound and acrylic acid chloride or methacrylic acid chloride. The reaction in this step is carried out preferably at a temperature of from 3 to 25° C. for from 1 to 5 hours. Diacrylic acid anhydride or dimethacrylic acid anhydride may be used as the acylating agent in place of acid chloride. When both of acrylic acid chloride and methacrylic acid chloride are used in the acylating step, a compound having an acrylamide group and a methacrylamide group in the same molecule can be obtained as a final product.

The compound obtained through the steps described above can be recovered by purification from a reaction product liquid using an ordinary method. For example, the purification may be carried out by, for example, separation extraction using an organic solvent, crystallization using a poor solvent, column chromatography using a silica gel, or the like.

Water

The ink composition according to the invention includes water.

In other words, the ink composition according to the invention is an aqueous ink composition.

The water used in the ink composition according to the invention is preferably water having a decreased content of ionic impurities, such as ion exchange water or distilled water.

The content of water in the ink composition is not particularly restricted, and is preferably from 10 to 99% by mass, more preferably from 30 to 90% by mass, and still more preferably from 50 to 90% by mass, with respect to the total mass of the ink composition.

Other Additives

In addition to the pigment, the water-soluble polymerizable compound, and the water described above, the ink composition according to the invention may further include at least one selected from the group consisting of a polymerization initiator, a polymer particle, a dispersant, a water-soluble organic solvent, a surfactant, and other additives, if necessary, within a range in which the effect of the invention is not impaired.

Polymerization Initiator

The ink composition according to the invention may include at least one polymerization initiator that initiates polymerization of the polymerizable compound when irradiated with an active energy radiation.

The polymerization initiator may be used singly or in combination of two or more thereof. The polymerization initiator may be used in combination with a sensitizer.

The polymerization initiator may be selected, as appropriate, from compounds capable of initiating a polymerization reaction of a polymerizable compound when irradiated with an active energy radiation. The polymerization initiator may be a polymerization initiator that generates an active species (such as a radical, an acid, or a base) when irradiated with a radiation or light or electron beams, such as a photopolymerization initiator. Photopolymerization initiators are preferable.

Examples of the photopolymerization initiator include acetophenone, 2,2-diethoxyacetophenone, p-dimethylaminoacetophenone, p-dimethylaminopropiophenone, benzophenone, 2-chlorobenzophenone, p,p'-dichlorobenzophenone, p,p'-bis-diethylaminobenzophenone, Michler's ketone, benzil, benzoin, benzoin methyl ether, benzoin ethyl ether, benzoin isopropyl ether, benzoin n-propyl ether, benzoin isobutyl ether, benzoin n-butyl ether, benzyl dimethyl ketal, tetramethylthiuram monosulfide, thioxanthone, 2-chloro thioxanthone, 2-methyl thioxanthone, azobisisobutyronitrile, benzoin peroxide, di-tert-butyl peroxide, 1-hydroxycyclohexyl phenyl ketone, 1-[4-(2-hydroxyethoxy)-phenyl]-2-hydroxy-2-methyl-1-propan-1-one, 2-hydroxy-2-methyl-1-phenyl-1-one, 1-(4-isopropylphenyl)-2-hydroxy-2-methylpropan-1-one, and methylbenzoyl formate. Examples of the photopolymerization initiator further include aromatic diazonium salts, aromatic halonium salts, aromatic sulfonium salts, and metallocene compounds, such as triphenylsulfonium hexafluorophosphate and diphenyliodonium hexafluoroantimonate.

When the ink composition includes a polymerization initiator, the content of polymerization initiator in the ink composition is preferably from 1 to 40% by mass, and more preferable from 5 to 30% by mass, with respect to the content of polymerizable compound. A content of polymerization initiator of 1% by mass or more further improves the scratch resistance of a formed image, and is favorable for high speed recording. A content of polymerization initiator of 40% by mass or smaller is favorable in terms of achieving favorable stability of ejection of the ink composition.

Examples of the sensitizer include amines (such as aliphatic amines, amines having an aromatic group, and piperidine), ureas (such as allyl-based ureas, and o-tolylthiourea), sulfur compounds (such as sodium diethyl dithiophosphate, and soluble salts of aromatic sulfinic acids), nitrile compounds (such as N,N-disubstituted p-aminobenzonitrile), phosphorous compounds (such as tri-n-butylphosphine and netrium diethyl dithiophosphate), nitrogen compounds (such as Michler ketone, N-nitrisohydroxylamine derivatives, oxazolidine compounds, tetrahydro-1,3-oxazine compounds, and condensates of formaldehyde or acetaldehyde and diamine), chlorine-containing compounds (such as carbon tetrachloride and hexachloroethane), a polymeric amine that is a reaction product of an epoxy resin and an amine, and triethanolamine triacrylate.

The ink composition according to the invention may include a sensitizer in a range in which the effects of the invention are not impaired.

Polymer Particle

The ink composition according to the invention may include at least one type of polymer particle. Inclusion of polymer particles that are insoluble or hardly soluble in water, in addition to the above-described resin for covering the pigment, further improves the fixability of the ink composition to recording media and the abrasion resistance of a formed image. However, the inclusion of the polymer particles facilitates attachment of the ink to an ejection head and deposition of the ink on the ejection head. In this regard, since the ink composition according to the invention can be fixed to recording media by curing, as described above, the ink composition according to the invention does not have to include a large amount of polymer particles or the like as a binder. Since the ink set according to the invention is configured using the ink composition described above and the maintenance liquid described below, ejection defects such as deviation of ink ejection direction or inability to eject are suppressed, and an excellent image forming properties can be maintained for a long time.

Whether or not a polymer is "insoluble or hardly soluble in water" is defined as follows. A polymer is dried at 105° C. for 2 hours, and then dissolved in 100 g of water at 25° C., and the amount of the polymer that dissolves in the 100 g of water is measured. If the amount of the polymer that dissolves in the 100 g of water is 15 g or less, the polymer is considered as "insoluble or hardly soluble in water". From the viewpoint of improving the suitability of the ink composition for continuous ejection and the stability of ejection of the ink composition, the dissolution amount is preferably 10 g or less, more preferably 5 g or less, and particularly preferably 1 g or less. The dissolution amount is a dissolution amount of the polymer that has been 100% neutralized with sodium hydroxide or acetic acid depending on the type of the salt forming groups of the polymer.

Examples of polymer particles that can be used include particles of an acrylic resin, particles of a vinyl acetate-based resin, particles of a styrene-butadiene-based resin, particles of a vinyl chloride-based resin, particles of an acrylic-styrene-based resin, particles of a butadiene-based resin, particles of a styrene-based resin, particles of a cross-linked acrylic resin, particles of a cross-linked styrene-based resin, particles of a benzoguanamine resin, particles of a phenol resin, particles of a silicone resin, particles of an epoxy resin, particles of a urethane resin, particles of a paraffine resin, and particles of a fluororesin, and preferable example thereof include particles of an acrylic resin, particles of an acrylic-styrene-based resin, particles of a styrene-based resin, particles of a cross-linked acrylic resin, and particles of a cross-linked styrene-based resin.

The polymer particles can suitably be used in the form of a polymer latex.

The weight-average molecular weight of the polymer particles is preferably from 10,000 to 200,000, and more preferably from 100,000 to 200,000.

The average particle size of the polymer particles is preferably in a range of from 10 nm to 1 μm, more preferably in a range of from 10 to 200 nm, still more preferably in a range of from 20 to 100 nm, and particularly preferably in a range of from 20 to 50 nm.

The glass transition temperature (Tg) of the polymer particles is preferably 50° C. or higher. Inclusion of polymer particles having a Tg of 50° C. or higher effectively improves the fixability of the ink composition to recording media and the abrasion resistance of a formed image. The Tg of the polymer particles is more preferably from 50° C. to 180° C., and still more preferably from 70° C. to 170° C.

The polymer particles preferably include self-dispersing resin particles (hereinafter sometimes referred to as "self-dispersing polymer particles").

Here, a self-dispersing polymer is a water-insoluble polymer that can get into a dispersed state in an aqueous medium due to functional groups (particularly, acidic groups or salts thereof) of the polymer itself even in the absence of a surfactant, when the polymer is dispersed by a phase inversion emulsification method.

The scope of the term "dispersed state" as used herein encompasses an emulsified state (emulsion) in which a water-insoluble polymer in liquid state is dispersed in an aqueous medium and a dispersed state (suspension) in which a water-insoluble polymer in solid state is dispersed in an aqueous medium.

The term "water-insoluble" means that the dissolution amount in 100 parts by mass of water (25° C.) is 5.0 parts by mass or less.

The self-dispersing polymer particles may be selected from those having a Tg of from 80° C. to 150° C. among the self-dispersing polymer particles described in paragraphs [0090] to [0121] of JP-A No. 2010-64480 and paragraphs [0130] to [0167] of JP-A No. 2011-068085.

The polymer constituting the polymer particles preferably includes at least one of a structural unit having an aromatic ring structure (an aromatic group) and a structural unit having an alicyclic structure (a alicyclic group). Here, the term "alicyclic group" has the same meaning as that of "cycloaliphatic group". This configuration further improves the strength (such as scratch resistance or anti-blocking properties) of a formed image, and suppresses the deformation of the formed image when a load is applied to the image due to accumulation of recording sheets; in other words suppresses an increase in the contact area between the formed image and a recording sheet that contacts the formed image or between the formed image and another image that contacts the formed image. Therefore, the configuration described above is effective in terms of suppression of stacker blocking Examples of the structural unit having an aromatic group include a structural unit having a phenyl group, a structural unit having a benzyl group, a structural unit having a phenoxy group, and a structural unit having a phenethyl group. In particular, a structural unit having a benzyl group and a structural unit having a phenoxy group (preferably, a structural unit having a phenoxyethyl group) are preferable.

The structural unit having an aromatic group is preferably derived from a monomer having an aromatic group (hereinafter sometimes referred to as "aromatic-group-containing monomer"). The aromatic-group-containing monomer in the invention is preferably a monomer having an ethylenic unsaturated bond and an aromatic group derived from an aromatic hydrocarbon. The aromatic-group-containing monomer may be used singly or in combination of two or more thereof. Examples of the aromatic-group-containing monomer include phenoxyethyl (meth)acrylate, benzyl (meth)acrylate, phenyl (meth)acrylate, and a styrene-based monomer. In particular, aromatic-group-containing (meth)acrylate monomers are preferable, phenoxyethyl (meth)acrylate, benzyl (meth) acrylate, and phenyl (meth)acrylate are more preferable, and phenoxyethyl (meth)acrylate and benzyl (meth)acrylate are still more preferable, from the viewpoint of achieving a favorable balance between the hydrophilicity and hydrophobicity of the polymer chain and favorable ink fixability.

The term "(meth)acrylate" as used herein refers to acrylate or methacrylate.

The structural unit having an alicyclic group is preferably derived from a monomer having an alicyclic group (hereinafter sometimes referred to as "alicyclic-group-containing monomer"). The alicyclic-group containing monomer is preferably a monomer having an alicyclic group and an ethylenic unsaturated bond, and is more preferably a (meth)acrylate having an alicyclic group (hereinafter sometimes referred to as "alicyclic (meth)acrylate").

The alicyclic (meth)acrylate is a compound that includes a moiety derived from (meth)acrylic acid and a moiety derived from an alcohol, the moiety derived from an alcohol having a structure containing at least one substituted or unsubstituted alicyclic hydrocarbon group. The alicyclic hydrocarbon group may be the moiety derived from an alcohol itself, or may be connected to the structural moiety derived from an alcohol via a linking group.

The alicyclic hydrocarbon group may be any group that contains a cyclic non-aromatic hydrocarbon group, without particular limitation. Examples thereof include a monocyclic hydrocarbon group, a bicyclic hydrocarbon group, and a polycyclic hydrocarbon group that is tricyclic or higher-cyclic. Examples of the alicyclic hydrocarbon group include: a cycloalkyl group such as a cyclopentyl group or a cyclohexyl group; a cycloalkenyl group; a bicyclohexyl group; a norbornyl group; an isobornyl group; a dicyclopentanyl group; a dicyclopentenyl group; an adamantyl group; a decahydronaphthalenyl group; a perhydrofluorenyl group; a tricyclo [5.2.1.0$^{2,6}$]decanyl group; and bicyclo[4.3.0]nonane.

The alicyclic hydrocarbon group may itself have a substituent. Examples of the substituent include an alkyl group, an alkenyl group, an aryl group, an aralkyl group, an alkoxy group, a hydroxyl group, a primary amino group, a secondary amino group, a tertiary amino group, an alkylcarbonyl group, an arylcarbonyl group, and a cyano group. Further, the alicyclic hydrocarbon group may form a condensed ring. In the invention, the alicyclic hydrocarbon group preferably has from 5 to 20 carbon atoms, from the viewpoints of achieving favorable viscosity of the ink composition and favorable dispersibility of the polymer particles.

Specific examples of the alicyclic (meth)acrylate include, but are not limited to, the compounds described below. Specific examples of alicyclic (meth)acrylates that are monocyclic include cycloalkyl (meth)acrylates containing a cycloalkyl group having from 3 to 10 carbon atoms, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate. Specific examples of alicyclic (meth)acrylates that are bicyclic include isobornyl (meth)acrylate and norbornyl (meth) acrylate. Specific examples of alicyclic (meth)acrylates that are tricyclic include adamantyl (meth)acrylate, dicyclopentanyl (meth)acrylate, and dicyclopentenyloxyethyl (meth)acrylate.

These alicyclic (meth)acrylates may be used singly or in combination of two or more thereof.

Among the above, the alicyclic (meth)acrylate is preferably at least one selected from the group consisting of a bicyclic (meth)acrylate and a tricyclic or higher-cyclic (meth) acrylate, and is more preferably selected from the group consisting of isobornyl (meth)acrylate, adamantyl (meth) acrylate, and dicyclopentanyl (meth)acrylate, from the viewpoint of achieving favorable dispersion stability of self-dispersing polymer particles, favorable fixability of the ink composition, and favorable resistance to stacker blocking of a formed image.

The polymer particles are preferably particles of a copolymer containing a structural unit having an aromatic group or a structural unit having an alicyclic group, and more preferably particles of a copolymer containing a structural unit derived from an aromatic-group-containing (meth)acrylate monomer or a structural unit derived from an alicyclic (meth) acrylate. Here, the total proportion of structural units having an aromatic group and structural units having an alicyclic group in the polymer particles is preferably from 5 to 85% by mass, and more preferable from 10 to 75% by mass. When the proportion is within the range described above, the Tg of the polymer can easily be adjusted to be in a range of from 80° C. to 150° C., and the stability of self-emulsified or dispersed state of the polymer particles improves.

Considering the removability of the ink composition from nozzles (maintainability) and the quality of re-ejection after the removal of the ink composition, polymer particles containing a structural unit having an aromatic group is more preferable.

The polymer particle preferably includes a hydrophilic structural unit from the viewpoint of achieving favorable dispersibility (in the case of self-dispersing polymer particles, favorable self-dispersibility) in the ink composition.

The hydrophilic structural unit is preferably derived from a monomer having a hydrophilic group (hereinafter sometimes referred to as "hydrophilic-group-containing monomer"). Here, the hydrophilic structural units in the polymer particles may be derived from only one type of hydrophilic-group-containing monomer or derived from two or more types of hydrophilic-group-containing monomers.

The hydrophilic group is not particularly restricted, and may be a dissociative group or a nonionic hydrophilic group. The hydrophilic group is preferably a dissociative group, and more preferably an anionic dissociative group, from the viewpoints of enhancing self-dispersibility and achieving favorable stability of the formed emulsion or dispersion state. The dissociative group may be, for example, a carboxyl group, a phosphoric acid group, or a sulfonic acid group. In particular, a carboxyl group is preferable as the dissociative group, from the viewpoint of achieving favorable fixability of the ink composition.

The hydrophilic-group-containing monomer is preferably a dissociative-group-containing monomer, and more preferably a dissociative-group-containing monomer having a dissociative group and an ethylenic unsaturated bond, from the viewpoint of achieving favorable self-dispersibility and favorable aggregation properties of the polymer particles. Examples of the dissociative-group-containing monomer include an unsaturated carboxylic acid monomer, an unsaturated sulfonic acid monomer, and an unsaturated phosphoric acid monomer.

Examples of the unsaturated carboxylic acid monomer include (meth)acrylic acid, crotonic acid, itaconic acid, maleic acid, fumaric acid, citraconic acid, and 2-methacryloyloxymethylsuccinic acid.

Examples of the unsaturated sulfonic acid monomer include styrenesulfonic acid, 2-acrylamide-2-methylpropane sulfonic acid, 3-sulfopropyl (meth)acrylate, and bis-(3-sulfopropyl) itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among dissociative-group-containing monomers, unsaturated carboxylic acid monomers are preferable, and (meth) acrylic acid is more preferable, from the viewpoint of the dispersion stability of the polymer particles and the stability of ejection of the ink composition.

The content ratio of hydrophilic structural units in the polymer particles is not particularly restricted, and, from the viewpoint of the dispersion stability of the polymer particles, the content ratio of hydrophilic structural units is preferably from 2 to 30% by mass, more preferably from 5 to 20% by mass, and particularly preferably from 5 to 15% by mass, with respect to the total amount of the polymer particles.

The polymer particles preferably include a structural unit having an alkyl group, from the viewpoint of achieving favorable flexibility of the polymer skeleton or facilitating the control of the glass transition temperature (Tg) of the polymer. In a structural unit having an alkyl group, the number of carbon atoms in the alkyl group is preferably from 1 to 4. The structural unit having an alkyl group is preferably derived from a monomer having an alkyl group (hereinafter sometimes referred to as "alkyl-group-containing monomer").

Examples of the alkyl-group-containing monomer include: alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; ethylenic unsaturated monomers each having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate; dialkylaminoalkyl (meth)acrylates such as dimethylaminoethyl (meth)acrylate; (meth)acrylamides, for example, N-hydroxyalkyl (meth)acrylamides such as N-hydroxymethyl (meth)acrylamide, N-hydroxyethyl (meth)acrylamide, and N-hydroxybutyl (meth)acrylamide, and N-alkoxyalkyl (meth)acrylamides such as N-methoxymethyl (meth)acrylamide, N-ethoxymethyl (meth)acrylamide, N-(n- or iso-)butoxymethyl (meth)acrylamide, N-methoxyethyl (meth)acrylamide, N-ethoxyethyl (meth)acrylamide, and N-(n- or iso-)butoxyethyl (meth)acrylamide.

Among these, alkyl (meth)acrylates are preferable, alkyl (meth)acrylates in which the alkyl group thereof has from 1 to 4 carbon atoms are more preferable, methyl (meth)acrylate and ethyl (meth)acrylate are still more preferable, and methyl (meth)acrylate is particularly preferable.

The content ratio of structural units having an alkyl group in the polymer particles is not particularly restricted. From the viewpoint of achieving favorable dispersion stability of the polymer particles, the content ratio is preferably from 5 to 90% by mass, and more preferably from 30 to 80% by mass, with respect to the total amount of the polymer particles.

The polymer particles may include a structural unit other than the structural units described above, if necessary.

The following embodiments I and II, in which the copolymerization ratio of the polymer constituting the polymer particles is specified, are preferable from the viewpoints of facilitating adjustment of the glass transition temperature to be from 80° C. to 150° C. and maintaining favorable dispersion stability of the polymer particles. Embodiment II is particularly preferable.

Embodiment I

In Embodiment I, the polymer constituting the polymer particles includes, in terms of copolymerization ratio:
from 5 to 60% by mass (particularly preferably, from 10 to 55% by mass) of structural unit having an aromatic group (preferably a benzyl group or a phenoxy group);
from 2 to 30% by mass (more preferably from 5 to 20% by mass, particularly preferably from 5 to 15% by mass) of hydrophilic structural unit; and
from 5 to 90% by mass (more preferably from 30 to 80% by mass) of structural unit having an alkyl group.

Embodiment II

In Embodiment II, the polymer constituting the polymer particles includes, in terms of copolymerization ratio:
from 5 to 60% by mass (particularly preferably from 10 to 55% by mass) of at least one of a structural unit derived from benzyl (meth)acrylate or a structural unit derived from phenoxyethyl (meth)acrylate;
from 2 to 30% by mass (more preferably from 5 to 20% by mass, particularly preferably from 5 to 15% by mass) of a structural unit derived from (meth)acrylic acid; and
from 5 to 90% by mass (more preferably from 30 to 80% by mass) of structural unit derived from alkyl (meth)acrylate in which the alkyl moiety thereof has from 1 to 4 carbon atoms.

The molecular weight range of the polymer constituting the polymer particles is preferably from 3,000 to 200,000, more preferably from 5,000 to 150,000, and still more preferably from 10,000 to 100,000, in terms of weight average molecular weight. When the weight average molecular weight is 3,000 or more, the amount of water-soluble components can effectively be decreased. When the weight average molecular weight is 200,000 or less, the stability of the self-dispersed state can be improved.

The weight average molecular weight is measured with a gel permeation chromatograph (GPC). The measurement is carried out using a HLC-8020GPC manufactured by Tosoh Corporation as a GPC, tandemly-connected three columns of TSKGEL SUPER HZM-H, TSKGEL SUPER HZ4000, and TSKGEL SUPER HZ200 (all manufactured by Tosoh Corporation), and THF (tetrahydrofuran) as an eluent. The GPC conditions are as follows:
sample concentration: 0.35% by mass
flow rate: 0.35 ml/min
sample injection amount: 10 μl
measurement temperature: 40° C.

The detection is carried out using an RI detector. The calibration curve is determined from the eight samples of standard sample Tsk Standard Polystyrene F-40, F-20, F-4, F-1, A-5000, A-2500, and A-1000 manufactured by Tosoh Corporation, and n-propylbenzene.

The average particle diameter of the polymer particles according to the invention (particularly, self-dispersing polymer particles) in terms of volume average particle diameter is preferably in the range of from 10 nm to 400 nm, more preferably in the range of from 10 nm to 200 nm, still more preferably from 10 nm to 100 nm, and particularly preferably from 10 nm to 50 nm. When the volume average particle diameter is 10 nm or more, the suitability for production is improved. When the volume average particle diameter is 400 nm or less, storage stability is improved. The particle size distribution of the polymer particles is not particularly limited, and may be a broad particle size distribution or a monodispersed particle size distribution. It is possible to use a mixture of two or more types of polymer particles.

The average particle diameter and particle size distribution of the polymer particles are obtained by measuring the volume average diameters of the particles by a dynamic light scattering method using a Nanotrac particle size distribution measuring instrument UPA-EX150 manufactured by Nikkiso Co., Ltd.

Specific examples of a water-insoluble polymer constituting the self-dispersing polymer particles include:
phenoxyethyl acrylate/methyl methacrylate/acrylic acid copolymer (50/45/5);
phenoxyethyl acrylate/benzyl methacrylate/isobutyl methacrylate/methacrylic acid copolymer (30/35/29/6);
phenoxyethyl methacrylate/isobutyl methacrylate/methacrylic acid copolymer (50/44/6);
phenoxyethyl acrylate/methyl methacrylate/ethylacrylate/acrylic acid copolymer (30/55/10/5);

benzyl methacrylate/isobutyl methacrylate/methacrylic acid copolymer (35/59/6);

isobornyl methacrylate/methyl methacrylate/methacrylic acid copolymer (5/85/10);

isobornyl methacrylate/methyl methacrylate/methacrylic acid copolymer (42/48/10);

isobornyl methacrylate/methyl methacrylate/methacrylic acid copolymer (72/20/8);

cyclohexyl methacrylate/methyl methacrylate/methacrylic acid copolymer (20/70/10);

styrene/phenoxyethyl acrylate/methyl methacrylate/acrylic acid copolymer (10/50/35/5);

benzyl acrylate/methyl methacrylate/acrylic acid copolymer (55/40/5);

phenoxyethyl methacrylate/benzyl acrylate/methacrylic acid copolymer (45/47/8);

styrene/phenoxyethyl acrylate/butyl methacrylate/acrylic acid copolymer (5/48/40/7);

benzyl methacrylate/isobutyl methacrylate/cyclohexyl methacrylate/methacrylic acid copolymer (35/30/30/5);

phenoxyethyl acrylate/methyl methacrylate/butyl acrylate/methacrylic acid copolymer (12/50/30/8);

benzyl acrylate/isobutyl methacrylate/acrylic acid copolymer (93/2/5);

styrene/phenoxyethyl methacrylate/butyl acrylate/acrylic acid copolymer (50/5/20/25);

styrene/butyl acrylate/acrylic acid copolymer (62/35/3); and methyl methacrylate/phenoxyethyl acrylate/acrylic acid copolymer (45/51/4).

Numbers in the parentheses represent the mass ratios of copolymerization components.

The ink composition according to the invention may include only one type of polymer particles (preferably self-dispersing polymer particles), or include two or more types of polymer particles (preferably self-dispersing polymer particles).

The content of polymer particles (in terms of solid content) is preferably less than 5% by mass, more preferable less than 3% by mass, with respect to the total amount of the ink composition. Most preferably, the ink composition does not include any polymer particles other than the above-described resin that covers the pigment (i.e., the content of polymer particles is 0% by mass).

The particle size distribution of the polymer particles is not particularly restricted, and may be either a wide particle size distribution or a monodispersed particle size distribution. It is also possible to use a mixture of two or more types of polymer particles each having a monodispersed particle size distribution.

Water-Soluble Organic Solvent

The ink composition according to the invention includes water as a solvent, and may further include at least one water-soluble organic solvent.

As used herein, the term "water-soluble organic solvent" means an organic solvent having a solubility in water at 25° C. of 1% by mass or higher.

Examples of water-soluble organic solvents that can be used include known water-soluble organic solvents, such as those described in paragraphs [0124] to [0135] of JP-A No. 2011-074150, paragraphs [0115] to [0128] of JP-A No. 2011-042150, and paragraphs [0104] to [0119] of JP-A No. 2011-079901.

When the ink composition according to the invention includes a water-soluble organic solvent, the content of water-soluble organic solvent is preferably 40% by mass or less, more preferably 20% by mass or less, still more preferably 10% by mass or less, and particularly preferably less than 3% by mass, with respect to the total mass of the ink composition. Here, a content of water-soluble organic solvent of less than 3% by mass suggests that water-soluble organic solvents are not positively incorporated into the ink composition. It is most preferable that the ink composition according to the invention does not include any water-soluble organic solvents (i.e., the content of water-soluble organic solvent is 0% by mass).

Surfactant

The ink composition according to the invention may include at least one surfactant, if necessary. The surfactant may be used, for example, as a surface tension adjuster.

Compounds having a structure containing both a hydrophilic portion and a hydrophobic portion in a molecule thereof, and the like can effectively be used as surfactants. Any of an anionic surfactant, a cationic surfactant, an amphoteric surfactant, a nonionic surfactant, or a betaine-type surfactant may be used. Further, the water-soluble polymer (polymeric dispersant) described above may be used as a surfactant.

In the invention, from the viewpoint of suppressing interference of ejected ink droplets, nonionic surfactants are preferable, and, among them, acetyleneglycol derivatives (acetyleneglycol-based surfactants) are more preferable.

Examples of the acetyleneglycol surfactants include 2,4,7,9-tetramethyl-5-decyn-4,7-diol and alkylene oxide adducts of 2,4,7,9-tetramethyl-5-decyn-4,7-diol. The acetyleneglycol-based surfactant is preferably at least one selected from these. Examples of commercially available products of these compounds include OLFIN E series, such as OLFIN E1010, manufactured by Nissin Chemical Industry Co., Ltd.

When the ink composition according to the invention includes a surfactant, the content of surfactant is not particularly limited, and is preferably 0.1% by mass or higher, more preferably from 0.1 to 10% by mass, and still more preferably from 0.2 to 3% by mass, with respect to the total mass of the ink composition.

From the viewpoint of successfully performing ejection of the ink composition using an inkjet method, the content of surfactant in the ink composition is preferably a content in a range with which the surface tension of the ink composition can be adjusted to be from 20 mN/m to 60 mN/m, more preferably from 20 mN/m to 45 mN/m, and still more preferably from 25 mN/m to 40 mN/m.

Other Components

The ink composition according to the invention may further include other additives than the aforementioned components, and examples of other additives include known additives such as polymerization inhibitors, antidrying agents (moisturizing agents), anti-fading agents, emulsion stabilizers, penetration enhancing agents, UV absorbers, antiseptic agents, antimildew agents, pH adjusters, surface tension adjusters, antifoam agents, viscosity adjusters, dispersion stabilizers, antirust agents and chelating agents. The manner of addition of these additives is generally direct addition to the ink composition.

Production Method

The ink composition according to the invention can be produced by ordinary methods. For example, the ink composition can be produced by mixing the pigment, the water-soluble polymerizable compound, and water, and, if necessary, other components (such as polymerization initiators, dispersants, water-soluble organic solvents, or surfactants). The method for mixing is not particularly restricted, and a usually-employed mixing method may be selected, as appropriate, and applied.

Maintenance Liquid

The maintenance liquid according to the invention includes at least:

water in an amount of 50% by mass or more with respect to the total amount of the maintenance liquid; and a water-soluble organic solvent having an SP value higher than 27.5 $MPa^{1/2}$ (hereinafter sometimes referred to as "organic solvent A") in an amount of from 5 to 30% by mass with respect to the total amount of the maintenance liquid, wherein the content of water-soluble organic solvent having an SP value of 27.5 $MPa^{1/2}$ or lower (hereinafter sometimes referred to as "organic solvent B") in the maintenance liquid is less than 5% by mass with respect to the total amount of the maintenance liquid, and the maintenance liquid has a pH higher than 8.5.

In other words, the maintenance liquid according to the invention includes at least water (the content of which is 50% by mass or more with respect to the total amount of the maintenance liquid) and the organic solvent A (the content of which is from 5 to 30% by mass with respect to the total amount of the maintenance liquid), and optionally includes the organic solvent B (the content of which is less than 5% by mass with respect to the total amount of the maintenance liquid, and the maintenance liquid has a pH higher than 8.5.

When the ink composition includes two or more organic solvents that satisfy the definition of the organic solvent A, the content of the organic solvent A described above refers to the total content of the two or more organic solvents. Similarly, when the ink composition includes two or more organic solvents that satisfy the definition of the organic solvent B, the content of the organic solvent B described above refers to the total content of the two or more organic solvents.

As used herein, the term "water-soluble organic solvent" means an organic solvent having a solubility in water at 25° C. of 1% by mass or higher.

In the invention, the SP value (solubility parameter; unit: $MPa^{1/2}$) of a water-soluble organic solvent refers to a value represented by the square root of the molecular cohesion energy, and is calculated according to the method described in R. F. Fedors, *Polymer Engineering Science*, 14, p 147 to 154 (1974).

The maintenance liquid according to the invention has high cleaning capacity with respect to the ink composition (for example, solids derived from the ink composition), which is a curable aqueous ink composition, while the aggregation of the pigment upon contact with the ink composition is suppressed. The reason why these effects can be obtained is not clear, but we presume the following mechanism.

The maintenance liquid having a water content of 50% by mass or higher also includes the organic solvent A in a proportion of from 5 to 30% by mass, which is higher than the proportion of the organic solvent B, and the maintenance liquid has pH of higher than 8. We presume that this configuration improves the solubility or swellability of the ink composition (for example, solids derived from the ink composition) attached to members such as inkjet heads in the maintenance liquid, thereby providing improved capacity to remove the ink composition by cleaning.

We also presume that since the maintenance liquid having a water content of 50% by mass or higher does not include the organic solvent B or includes the organic solvent B at a content of less than 5% by mass, the dispersed state of the pigment is hard to break, and aggregation of the pigment is resultantly suppressed.

Use of the maintenance liquid according to the invention also makes it possible to suppress deterioration of members of ejection heads such as liquid repellent films. Liquid repellent films provided on the nozzle plates of ejection heads generally include a fluorine compound. A maintenance liquid having the composition and the properties as defined above hardly reacts with the fluorine compound, and the maintenance liquid is less likely to change the surface properties of the liquid repellent films, and is less likely to cause detachment of the liquid repellent films.

The content of the organic solvent A in the maintenance liquid is from 5 to 30% by mass with respect to the total amount of the maintenance liquid. From the viewpoint of effectively achieving both of improved capacity to remove the ink composition by cleaning and suppression of aggregation of the pigment when the maintenance liquid contacts with the ink composition, the content of the organic solvent A is preferably from 5 to 20% by mass, and more preferably from 10 to 20% by mass, with respect to the total amount of the maintenance liquid. When the content of the organic solvent A is less than 5% by mass with respect to the total amount of the maintenance liquid, an ink composition attached to a member such as an inkjet head is hardly dissolved. When the content of the organic solvent A is more than 30% by mass with respect to the total amount of the maintenance liquid, an aggregate is generated when the maintenance liquid contacts the ink composition.

The content of water in the maintenance liquid is 50% by mass or higher, preferably from 50 to 95% by mass, more preferably from 55 to 80% by mass, and particularly preferably from 60 to 80% by mass, with respect to the total amount of the maintenance liquid. When the content of water is 95% by mass or lower, the content of the organic solvent A and the organic solvent B can easily be adjusted to be within the above-described ranges. However, when the content of water is less than 50% by mass with respect to the total amount of the maintenance liquid, the maintenance liquid would have a decreased compatibility with ejection head members. In an embodiment, the content of water is from 69% by mass to 94% by mass.

The respective components of the maintenance liquid according to the invention will be more specifically described.

Water-Soluble Organic Solvent Having SP Value of Higher than 27.5 $MPa^{1/2}$ (Organic Solvent A)

The maintenance liquid according to the invention includes at least one water-soluble organic solvent having an SP value of higher than 27.5 $MPa^{1/2}$ (organic solvent A).

The content of the organic solvent A is as described above.

The SP value of the organic solvent A is not particularly restricted as long as the SP value is higher than 27.5 $MPa^{1/2}$. The SP value of the organic solvent A is preferably 28.5 $MPa^{1/2}$ or higher, and more preferable 30.0 $MPa^{1/2}$ or higher, from the viewpoint of achieving both of more improved capacity of the maintenance liquid to remove the ink composition by cleaning and more effective suppression of aggregation of the pigment when the maintenance liquid contacts the ink composition. The upper limit of the SP value of the organic solvent A is not particularly restricted. The upper limit is preferably 35.0 $MPa^{1/2}$ from the viewpoint of achieving more improved capacity of the maintenance liquid to remove the ink composition by cleaning The organic solvent A may be any water-soluble organic solvent having an SP value of higher than 27.5 $MPa^{1/2}$, without particular restrictions. Polyhydric alcohols are preferable.

Specific examples of the organic solvent A include, but are not limited to, those listed below. In the specific examples described below, the value in the parenthesis that follows each specific example is an SP value (unit: $MPa^{1/2}$).

Examples of the organic solvent A include ethyleneglycol (30.34), diethyleneglycol (DEG)(30.62), triethyleneglycol (27.79), propyleneglycol (27.59), 1,4-butanediol (30.66), 1,2-pentanediol (28.64), 1,5-pentanediol (28.96), 1,6-hexanediol (27.66), glycerin (33.52), dimethylformamide (30.62), methanol (28.17), isopropyl alcohol (28.69), and triethanolamine (32.27).

The maintenance liquid according to the invention may include only one type of the organic solvent A, or include two or more types of the organic solvent A.

Among these, ethyleneglycol, diethyleneglycol, propyleneglycol, glycerin, diglycerin, 1,4-butanediol, 1,5-pentanediol, and 1,6-hexanediol are preferable, glycerin, diethyleneglycol, and 1,5-pentanediol are more preferable, glycerin and diethyleneglycol are still more preferable, and glycerin is particularly preferable.

Water-Soluble Organic Solvent Having SP Value of 27.5 $MPa^{1/2}$ or Lower (Organic Solvent B)

In the maintenance liquid according to the invention, the content of water-soluble organic solvent having an SP value of 27.5 $MPa^{1/2}$ or lower (organic solvent B) is less than 5% by mass with respect to the total amount of the maintenance liquid.

From the viewpoint of effectively achieving both of improved capacity to remove the ink composition by cleaning and suppression of aggregation of the pigment when the maintenance liquid contacts the ink composition, the content of the organic solvent B is preferably less than 1% by mass, and it is particularly preferable that the maintenance liquid does not include the organic solvent B (content: 0% by mass).

The organic solvent B is not particularly limited as long as it is a water-soluble organic solvent having an SP value of 27.5 $MPa^{1/2}$ or lower, and examples thereof include polyethyleneglycol (26.14), 1,2-hexanediol (24.14), diethyleneglycol monobutyl ether (DEGmBE)(21.51), dipropyleneglycol (27.14), 1,2-butanediol (26.09), ethyleneglycol monoethyl ether (23.47), ethyleneglycol monobutyl ether (22.12), diethyleneglycol monomethyl ether (22.98), diethyleneglycol monoethyl ether (22.4), diethyleneglycol monopropyl ether (21.9), triethyleneglycol monomethyl ether (22.1), triethyleneglycol monoethyl ether (21.7), triethyleneglycol monobutyl ether (21.1), propyleneglycol monomethyl ether (23.05), propyleneglycol monoethyl ether (22.34), propyleneglycol monopropyl ether (21.79), propyleneglycol monobutyl ether (21.35), dipropyleneglycol monomethyl ether (21.3), dipropyleneglycol monopropyl ether (20.69), dipropyleneglycol monobutyl ether (20.45), dipropyleneglycol t-butyl ether (19.98), tripropyleneglycol monomethyl ether (20.4), diethyleneglycol monohexyl ether (20.91), ethyleneglycol mono-2-ethylhexyl ether (20.46), and diethyleneglycol mono-2-ethylhexyl ether (20.26).

When the maintenance liquid in the invention includes the organic solvent B, the maintenance liquid may include only one type of the organic solvent B, or include two or more types of the organic solvent B.

Water

The maintenance liquid according to the invention includes water.

The water contained in the maintenance liquid according to the invention is preferably water in which the content of ionic impurities has been reduced, such as ion exchange water or distilled water.

The content of water is as described above.

Various Additives

The maintenance liquid in the invention may include the organic solvent A, the organic solvent B, and water, and, if necessary, may further include surfactants and other additives within a range in which the effects of the invention are not impaired.

Surfactant

The maintenance liquid according to the invention preferably includes at least one surfactant as a surface tension adjuster. When the content of the organic solvent A in the maintenance liquid is low, the capacity to remove the ink composition by cleaning tends to decrease. However, use of a surfactant allows the cleaning capacity to be maintained.

Any of an anionic surfactant, a cationic surfactant, an amphoteric surfactant, a nonionic surfactant, or a betaine-type surfactant may be used as a surfactant in the maintenance liquid.

In the invention, a nonionic surfactant is preferable, and, among them, acetyleneglycol derivatives (acetyleneglycol-based surfactants) are more preferable, from the viewpoint of preventing an aggregation reaction with the ink composition.

Examples of the acetyleneglycol-based surfactants include 2,4,7,9-tetramethyl-5-decyn-4,7-diol and alkylene oxide adducts of 2,4,7,9-tetramethyl-5-decyn-4,7-diol. The acetyleneglycol-based surfactant is preferably at least one selected from these. Examples of commercially available products of these compounds include OLFIN E series, such as OLFIN E1010, manufactured by Nissin Chemical Industry Co., Ltd.

When the maintenance liquid according to the invention includes a surfactant, the content of surfactant is preferably from 0.5 to 10% by mass, and more preferably from 1 to 3% by mass, with respect to the total mass of the maintenance liquid. A content of surfactant within the range described above is preferable in terms of the cleaning capacity.

Other Components

The maintenance liquid in the invention may include other additives than the above-described components, if necessary. Examples of other additives include known additives such as pH adjusters, ultraviolet absorbers, anti-fading agents, anti-mildew agents, emulsion stabilizers, penetration enhancing agents, antiseptic agents, antifoam agents, and viscosity adjusters. The manner of addition of such additives is generally direct addition to the maintenance liquid.

A pH adjuster in the maintenance liquid may be a neutralizer such as an organic base or an inorganic alkali. The use of the pH adjuster allows adjustment of the pH of the maintenance liquid, and also improves the storage stability of the maintenance liquid. The pH adjuster may be added preferably such that the pH of the maintenance liquid becomes more than 8.5, more preferably from more than 8.5 and 10.0.

Properties of Maintenance Liquid

The pH of the maintenance liquid is preferably more than 8.5, and more preferably from more than 8.5 to 10.0, from the viewpoint of more effectively achieving both of improved capacity to remove the ink composition by cleaning, and suppression of aggregation of the pigment when the maintenance liquid contacts the ink composition.

The following formula is preferably satisfied.

$$(A)/(B) \leq 1.1$$

wherein (A) represents a diameter of dispersed particles present when the maintenance liquid is added to the ink composition to dilute the ink composition 100-fold, and (B) represents a diameter of dispersed particles present in the ink composition before dilution. Here, the "diameter of dispersed particles" refers to a volume average particle diameter of the dispersed particles according to a dynamic light scattering method, as measured using a Nanotrac particle size distribution measuring instrument UPA-EX150 (manufactured by NIKKISO Co., Ltd.).

Production Method

The maintenance liquid according to the invention can be produced according to ordinary methods. For example, the maintenance liquid can be produced by mixing the organic solvent A, the organic solvent B, and water, and, if necessary, other components (such as a basic compound or a surfactant). The mixing method is not particularly restricted, and may be selected, as appropriate, from usually-employed mixing methods and applied.

Image Forming Method

In the image forming method according to the invention, the ink set for inkjet recording according to the invention is used. The image forming method includes:

an ink application step of applying an ink composition to a recording medium by ejecting the ink composition from an inkjet recording head; and an ink removal step of removing, using a maintenance liquid, any of the ink composition that has attached to the inkjet recording head.

The image forming method according to the invention may preferably further include a treatment liquid application step of applying a treatment liquid that includes an aggregation component that aggregates a component in the ink composition to the recording medium.

In the image forming method according to the invention, the maintenance liquid according to the invention is used. As described above, the maintenance liquid according to the invention has high capacity to dissolve an ink that easily attach to the surface of an ink ejection head and that cannot be easily dissolved or removed after drying, particularly, solids derived from the ink formed by solidification due to drying. Therefore, the image forming method according to the invention enables stable image forming properties to be maintained for a long time. As a result, phenomenon such as clogging of ejection holes or generation of deposited matter in the neighborhood of the ejection holes due to ink-derived solids generated by drying and solidification of mist-like ink fine droplets is prevented in a process of, for example, wiping after cleaning.

An inkjet recording head that has a nozzle plate having plural ejection holes arranged two-dimensionally and having a liquid repellent film containing a fluorine compound on the surface on which the ejection holes are formed can suitably be used, aiming to improve the ink shedding properties during ejection, thereby improving the ejection properties. Since the maintenance liquid according to the invention is used in the image forming method according to the invention, changes in the surface physical properties of the liquid repellent film, detachment of the liquid repellent film, and the like can be suppressed as described above. Therefore, the image forming method according to the invention enables high ejection accuracy to be maintained continuously, and enables stable image forming properties to be maintained for a long time.

Examples of the inkjet recording head described above include known inkjet recording heads disclosed in JP-A No. 2011-111527 or JP-A No. 2011-063777.

Ink Application Step

In the ink application step in the invention, the ink composition is applied to a recording medium by being ejected from an inkjet recording head, to form an image. In this step, the ink composition can be applied to the recording medium, to form a desired visible image. Details of the ink composition are as described above.

The inkjet method is not particularly limited, and may be any known method such as a charge control method in which an ink is ejected utilizing an electrostatic attraction force, a drop-on-demand method in which a vibration pressure generated by a piezoelectric element is utilized (pressure pulse system), an acoustic inkjet method in which an ink is irradiated with acoustic beams generated by conversion from electric signals so as to be ejected by a radiation pressure, and a thermal inkjet system in which an ink is heated to form bubbles and the resultant pressure is utilized (BUBBLEJET (registered trade mark)). An inkjet method that can be effectively employed in the invention is an inkjet method disclosed in JP-A No. S54-59936, in which an ink that has received thermal energy undergoes a rapid volume change, and a force generated by this state change is used to eject an ink from a nozzle.

The scope of the inkjet method includes a method in which a large number of small-volume ink droplets having low color concentrations, which are called "photo-ink", are ejected, a method in which plural inks having substantially the same hue but at different color concentrations are used to improve the image quality, and a method in which a colorless transparent ink is used.

The inkjet head used in the inkjet method may adopt either an on-demand method or a continuous method. Specific examples of ejection methods include an electric-mechanical conversion method (such as single cavity-type, double cavity-type, bender-type, piston-type, share mode-type, or shared wall-type), an electric-thermal conversion method (such as thermal inkjet-type or BUBBLEJET-type (registered trade mark)), an electrostatic attraction method (for example, electric field control-type or slit jet-type), and an electric discharge method (such as spark jet-type). Any of these ejection methods may be employed in the invention Ink nozzles and the like used for recording by the inkjet methods are not particularly restricted, and may be selected, as appropriate, in accordance with the purpose.

Regarding the inkjet head, there are a shuttle system in which recording is carried out while a short serial head having a small length is moved in the width direction of a recording medium in a scanning manner, and a line system in which a line head having recording devices that are aligned correspondingly to the entire length of one side of a recording medium is used. In the line system, image recording can be performed over the entire one surface of a recording medium by moving the recording medium in a direction orthogonal to the direction in which the recording devices are arranged; therefore, a conveyance system, such as carriage, which moves the short head in a scanning manner is unnecessary. Since a complicated scan-movement control of the movement of the carriage and the recording medium is unnecessary and only the recording medium is moved, the recording speed can be increased compared to the shuttle system.

The image forming method according to the invention can be applied to both of these systems; effects with respect to improvement of the ejection accuracy and the abrasion resistance of a formed image are greater when the image forming method according to the invention is applied to the line system, in which dummy ejecting is generally not performed.

In the ink application step, the size of each ink droplet to be applied (ejected) is preferably from 1.5 to 3.0 pL, and more preferably from 1.5 to 2.5 pL, from the viewpoint of high definition printing.

The size of each ink droplet can be adjusted by appropriately selecting the ejection conditions in the inkjet method, in accordance with the ink composition to be ejected.

Ink Removal Step

In the ink removal step in the invention, the ink composition that has attached to the inkjet recording head during ejection of the ink composition in the ink application step (for example, ink-derived solids generated by solidification by drying) is removed using the maintenance liquid. Details of the configuration of the maintenance liquid used in this step and details thereof, such as preferable embodiments, are as described above.

In the ink removal step, the maintenance liquid is applied to a head (for example, at or around the head, ink flow channels, and the like; hereinafter sometimes referred to as "head and the like"), so as to remove the ink composition from the nozzle surface of the head. The application of the maintenance liquid to the head and the like results in dissolution, swelling, or the like of the ink composition.

The application of the maintenance liquid can be performed by, for example, ejection using an inkjet method, coating using a roller, spraying, or the like. The application of the maintenance liquid is preferably performed by a method disclosed in, for example, JP-A No. 2011-73295 or JP-A No. 2011-73339. In this method, a column of a maintenance liquid is formed on a maintenance liquid (cleaning liquid) application unit by utilizing a water head difference, and, when an inkjet recording head passes across the maintenance liquid column, a liquid film is formed between the head and the maintenance liquid application unit, whereby the maintenance liquid is applied to the head.

Wiping with a blade or wiping with cloth or paper is preferably carried out before or after the application of the maintenance liquid, so as to remove the ink composition. Examples of preferable methods include a method of scraping off the ink composition by rubbing (wiping) the nozzle surface using a wiper blade after the application of the maintenance liquid, a method of removing the ink composition using, for example, an air pressure or a liquid pressure of the maintenance liquid or the like, and a method of wiping the ink composition with cloth or paper. A method of wiping the ink composition with cloth or paper is particularly preferable. A method in which wiping is carried out always with new cloth is disclosed in, for example, JP-A No. 2010-241127. The method disclosed in JP-A No. 2010-241127 decreases the frequency of exchange of the wiping member and downsizes the apparatus.

In a method of wiping off the ink composition with cloth or paper, the maintenance liquid may be directly applied to cloth or paper, and the head face may be wiped with the cloth or paper in the wet state. With this method, the amount of the maintenance liquid to be used can be made smaller than that in a method in which the maintenance liquid is applied using an application unit before wiping. Therefore, this method is also preferable.

The material of the wiper blade is preferably an elastic rubber. Specific examples of the material include butyl rubber, chloroprene rubber, ethylene-propylene rubber, silicone rubber, urethane rubber, and nitrile rubber. A wiper blade that is coated with a fluororesin or the like so as to be provided with ink-repellency may also be used.

The amount of the maintenance liquid to be applied may be any amount that causes dissolution, swelling, or the like of the ink composition, without particular restriction. The amount of the maintenance liquid to be applied is preferably from 1 to 100 g/m$^2$.

Treatment Liquid Application Step

In the treatment liquid application step according to the invention, a treatment liquid that includes an aggregation component capable of aggregating a component of the ink composition is applied to the recording medium. The ink composition and the aggregation component mix on the recording medium, whereby the aggregation of the pigment or the like that is stably dispersed in the ink composition is accelerated.

The application of the treatment liquid can be performed using a known method, such as a coating method, an inkjet method, or an immersion method. The coating method may be a known coating method using a bar coater, an extrusion die coater, an air doctor coater, a blade coater, a rod coater, a knife coater, a squeeze coater, a reverse roll coater, a bar coater, or the like. Details of the inkjet method are as described above.

The aggregation component is preferably at least one selected from the group consisting of a cationic polymer, an acidic compound, and a polyvalent metal salt, from the viewpoint of image quality.

The cationic polymer is preferably a polymer having, as a cationic group, a primary, secondary, or tertiary amino group, or a quaternary ammonium base. The cationic polymer is preferably a homopolymer of a monomer having a primary, secondary, or tertiary amino group, a salt thereof, or a quaternary ammonium base (cationic monomer), or a copolymer or condensed polymer of the cationic monomer and at least one other monomer (non-cationic monomer). Each of these polymers may be in the form of either a water-soluble polymer or water-dispersible latex particles. More specifically, the cationic polymer may be selected from the group consisting of a poly(vinyl pyridine) salt, polyalkylaminoethyl acrylate, polyalkylaminoethyl methacrylate, poly(vinylimidazole), polyethylene imine, polybiguanide, polyguanide, a copolymer containing an epihalohydrin derivative and an amine derivative, and combinations of these cationic polymers.

The treatment liquid may further include an aqueous solvent (such as water) in addition to the cationic polymer.

The content ratio of the cationic polymer in treatment liquid is preferably from 5 to 95% by mass, and more preferably from 10 to 80% by mass, with respect to the total amount of the treatment liquid, from the viewpoint of aggregation effect.

Examples of the acidic compound include a compound capable of changing the pH of the ink composition. The acidic compound may be, for example, a compound having a phosphate group, a phosphonate group, a phosphine group, a sulfate group, a sulfonate group, a sulfinic acid group, or a carboxyl group, or a salt thereof (for example, a polyvalent metal salt). Among these, a compound having a phosphate group or a carboxyl group is preferable, and a compound having a carboxyl group is more preferable, from the viewpoint of the aggregation speed of the ink composition. Examples of the compound having a carboxyl group include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, and nicotinic acid, and derivatives of these compounds, and salts thereof (such as polyvalent metal salts).

When the acidic compound is used, the pH (25° C.) of the treatment liquid is preferably in a range of from 0.5 to 3, more preferably in a range of from 0.6 to 2, and still more preferably in a range of from 0.7 to 1.5, from the viewpoint of the aggregation speed of the ink composition.

From the viewpoint of aggregation effect, the content of the acidic compound in the treatment liquid is preferably from 5 to 95% by mass, and more preferably from 10 to 80% by mass, with respect to the total amount of the treatment liquid.

Examples of the polyvalent metal salt include salts of alkaline earth metals belonging to group 2 of the periodic table (for example, magnesium, calcium), salts of transition metals belonging to group 3 of the periodic table (for example, lanthanum), salts of cations from group 13 of the periodic table (for example, aluminium), and salts of lanthanides (for example, neodymium). Preferable metal salts include carboxylates (for example, formates, acetates, and benzoates), nitrates, chlorides, and thiocyanates. Among them, calcium or magnesium salts of carboxylic acids (for example, formic acid, acetic acid, and benzoic acid), calcium or magnesium salts of nitric acid, calcium chloride, magnesium chloride, and calcium or magnesium salts of thiocyanic acid are preferable.

The content of polyvalent metal salt in the treatment liquid is preferably from 1 to 10% by mass, more preferably from 1.5 to 7% by mass, and still more preferably from 2 to 6% by mass.

The viscosity of the treatment liquid is preferably from 1 to 30 mPa·s, more preferably from 1 to 20 mPa·s, and still more preferably from 2 to 15 mPa·s, and particularly preferably from 2 to 10 mPa·s, from the viewpoint of achieving favorable aggregation speed of the ink composition. Here, the viscosity is measured using a VISCOMETER TV-22 (manufactured by TOKI SANGYO CO. LTD) at 20° C. The surface tension of the treatment liquid is preferably from 20 to 60 mN/m, more preferably from 20 to 45 mN/m, and still more preferably from 25 to 40 mN/m, from the viewpoint of achieving favorable aggregation speed of the ink composition. Here, the surface tension is measured using an AUTOMATIC SURFACE TENSIOMETER CBVP-Z (manufactured by Kyowa Interface Science Co., Ltd.) at 25° C.

The treatment liquid application step may be performed before or after the ink application step using the ink composition. The treatment liquid application step is preferably carried out before the ink application step. In the case of carrying out the treatment liquid application step before the ink application step, the treatment liquid for aggregating a component (resin particles or the like) in the ink composition is applied to a recording medium prior to the application (ejection) of the ink composition, and the ink composition is ejected so as to contact the treatment liquid that has been provided on the recording medium, as a result of which an image is formed. When the treatment liquid application step is carried out before the ink application step, inkjet recording can be performed at higher speed, and an image having high density and high resolution can be obtained even when recording is carried out at high speed.

It is preferable to dry the treatment liquid on the recording medium by heating in a period after the application of the treatment liquid to the recording medium but before the application of the ink composition. Due to the drying by heating, the ink coloring properties, such as suppression of bleed, are improved, thereby enabling recording of a visible image having excellent color density and excellent hue.

The drying by heating may be performed using a known heating means such as a heater, an air blowing means utilizing blowing such as a drier, or a means in which a heating means and an air blowing means are combined.

Examples of heating methods include: a method in which heat is supplied by a heater or the like from a side of the recording medium opposite to a surface provided with the treatment liquid; a method in which a warm or hot air is blown to a surface of the recording medium provided with the treatment liquid; a heating method using an infrared heater; and a combination of two or more of these heating methods.

Maintenance Method

The maintenance method using the ink set according to the invention includes applying the maintenance liquid according to the invention to an inkjet recording head to which the ink composition according to the invention has attached, to remove the ink composition from the inkjet recording head. Details of the maintenance liquid, including the configuration and preferable embodiments of the maintenance liquid, are as described above.

As described above, the maintenance liquid according to the invention has high dissolution power with respect to ink-derived solids, and the ink-derived solids can easily be removed by dissolution when the maintenance liquid is applied to the inkjet recording head. Therefore, wiping operations or the like performed after the removal of the ink-derived solids does not cause clogging of ejection holes or increased deposition in the neighborhood of ejection holes.

The removal of the ink composition is carried out by applying the maintenance liquid to a head (for example, at or around the head, ink flow channels and the like (head and the like)) so as to remove the ink composition that has attached to the nozzle face of a head. The application of the maintenance liquid to the head and the like causes dissolution, swelling, or the like of the ink composition.

The application of the maintenance liquid can be performed by, for example, ejection using an inkjet method, coating using a roller, spraying, or the like. A specific example of the application of the maintenance liquid is a method disclosed in JP-A No. 2011-73295 or JP-A No. 2011-73339. In this method, a column of a maintenance liquid is formed on a maintenance liquid (cleaning liquid) application unit by utilizing a water head difference, and, when an inkjet recording head passes across the maintenance liquid column, a liquid film is formed between the head and the maintenance liquid application unit, whereby the maintenance liquid is applied to the head.

The maintenance method may be performed by carrying out the same operation as those in the ink removal step in the image forming method according to the invention.

According to the invention, an ink set for inkjet recording and an image forming method can be provided, each of which is capable of stably maintaining ink ejection quality by suppressing ink ejection defects caused by pigment-ink-derived solids resulting from drying, or suppressing generation of pigment aggregates that may be generated by contact of the pigment ink with a maintenance liquid.

Examples

In the following, the invention will be described in further details with reference to examples. However, the invention is not limited to those examples as long as the gist of the invention is retained. Moreover, the terms "part" and "%" are based on mass unless specified otherwise.

In Examples, weight average molecular weight was measured by gel permeation chromatography (GPC), and calculated as a polystyrene-equivalent value. In the GPC measurement, an obtained polymer was isolated by removing solvent therefrom. The obtained solids were diluted with tetrahydrofran to 0.35% by mass, and subjected to measurement with a HLC-8020GPC (manufactured by Tosoh Corporation) through a column in which TSKgel Super HZM-H, TSKgel Super HZ4000, and TSKgel Super HZ200 (all manufactured by Tosoh Corporation) were tandemly connected. Regarding the GPC conditions, the flow rate was 0.35 mL/min, the sample injection amount was 10 µL, and the measurement temperature was 40° C. The detection was performed using an RI detector. The calibration curve was determined from the eight samples of standard sample Tsk Standard Polystyrene F-40, F-20, F-4, F-1, A-5000, A-2500, and A-1000 manufactured by Tosoh Corporation, and N-propylbenzene.

The acid values of polymers were determined according to the method specified in the JIS standard (JIS K0070: 1992).

Preparation of Ink Composition

Synthesis of Water-Soluble Polymeric Dispersant Q-1

A monomer supply solution was prepared by mixing methacrylic acid (172 parts), benzyl methacrylate (828 parts), and isopropanol (375 parts). An initiator supply composition was prepared by mixing 2,2-azobis(2-methylbutyronitrile) (22.05 parts) and isopropanol (187.5 parts).

Next, isopropanol (187.5 parts) was heated to 80° C. under a nitrogen atmosphere, and a mixture of the monomer supply composition and the initiator supply composition was added dropwise thereto over 2 hours. After the dropwise addition, the mixture was maintained at 80° C. for another 4 hours, and cooled to 25° C.

After cooling, the solvents were removed under reduced pressure, as a result of which a water-soluble polymeric dispersant Q-1 (water-soluble polymer) having a weight-average molecular weight of about 30,000 and an acid value of 112 mgKOH/g was obtained.

Production of Cyan Ink C1 (Cyan Ink Composition)

Production of Cyan Pigment Dispersion C-1

0.8 equivalents of the amount of methacrylic acid contained in the water-soluble polymeric dispersant Q-1 (150 parts) were neutralized with an aqueous potassium hydroxide solution, and then ion exchange water was further added so as to adjust the concentration of the water-soluble polymeric dispersant to 25%, as a result of which a water-soluble polymeric dispersant aqueous solution was obtained.

The water-soluble polymeric dispersant aqueous solution (124 parts), Pigment Blue 15:3 (cyan pigment) (48 parts), water (75 parts), and dipropyleneglycol (30 parts) were mixed, and the mixture was dispersed with a bead mill (bead diameter: 0.1 mmϕ, zirconia bead) until a desired volume average particle diameter was obtained, as a result of which a dispersion of polymer-coated cyan pigment particles having a pigment concentration of 15% (non-cross-linked dispersion C-1) was obtained.

DENACOL EX-321 (manufactured by Nagase ChemteX Corporation, cross-linking agent) (1.3 parts) and an aqueous boric acid solution (boric acid concentration: 4% by mass) (14.3 parts) were added to the non-cross-linked dispersion C-1 (136 parts), and the mixture was allowed to react at 50° C. for 6.5 hours. Then, the mixture was cooled to 25° C., thereby obtaining a cross-linked dispersion C-1. Next, ion exchange water was added to the obtained cross-linked dispersion C-1, and the dispersion was subjected to ultrafiltration using an agitation-type ultraholder (manufactured by Toyo Roshi Kaisha Ltd.) and ultrafiltration filter (manufactured by Toyo Roshi Kaisha Ltd., molecular weight cutoff: 50,000, Q0500076E ultrafilter), thereby carrying out purification to decrease the concentration of dipropyleneglycol in the dispersion to 0.1% by mass or lower. Then, the purified dispersion was concentrated until the concentration of the pigment became 15% by mass, as a result of which a cyan pigment dispersion C-1 was obtained. The pigment contained in the cyan pigment dispersion C-1 was a polymer-coated pigment (encapsulated pigment) having a surface coated with a cross-linked polymer generated by cross-linking of the water-soluble polymeric dispersant Q-1 with the cross-linking agent.

Synthesis of Polymerizable Compound a

The water-soluble polymerizable compound a shown below was synthesized in the following manner.

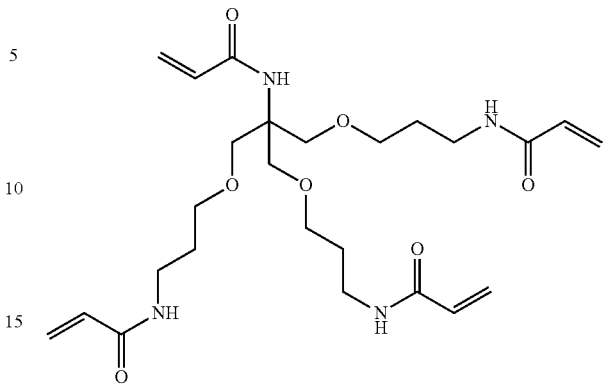

Polymerizable Compound a

First Step

Tris(hydroxymethyl)aminomethane (manufactured by Tokyo Chemical Industry Co., Ltd.) (121 g, 1 equivalent), 50% by mass of an aqueous potassium hydroxide solution (84 ml), and toluene (423 ml) were added into a 1 L-volume three-necked flask equipped with a stirrer bar, and the mixture in the flask was stirred. Then, acrylonitrile (397.5 g, 7.5 equivalents) was added dropwise thereto over 2 hours while the reaction system was maintained at a temperature of from 20 to 25° C. in a water bath. After the dropwise addition, the resultant mixture was stirred for 1.5 hours. Thereafter, toluene (540 ml) was added to the reaction system, the resultant reaction mixture was transferred to a reparatory funnel, and the aqueous phase was removed. The remaining organic phase was dried over magnesium sulfate, and then filtration using Celite was carried out, and the solvent was removed under reduced pressure, as a result of which an acrylonitrile adduct was obtained. Since the results of the analysis of the obtained substance by $^1$H-NMR and MS exhibited good agreement with known results of a desired compound, the obtained substance was used in the next reduction reaction without further purification.

Second Step

The obtained acrylonitrile adduct (24 g), a Ni catalyst (RANEY NICKEL 2400, manufactured by W.R.Grace & Co.) (48 g), and a 25% by mass aqueous ammonia solution (water:methanol=1:1) (600 ml) were placed in a 1 L-volume autoclave, and suspended, and the reaction container was hermetically sealed. 10 Mpa hydrogen was introduced into the reaction container, and the mixture in the autoclave was allowed to react at a reaction temperature of 25° C. for 16 hours.

Disappearance of the raw materials was confirmed by $^1$H-NMR, the reaction mixture was filtered using Celite, and the Celite was washed with methanol several times. Solvents were removed from the filtrate under reduced pressure, as a result of which a polyamine body was obtained. The obtained substance was used in the next reaction without further purification.

Third Step

The obtained polyamine body (30 g), NaHCO$_3$ (120 g, 14 equivalents), dichloromethane (1 L), and 50 ml of water were added into a 2 L three-necked flask equipped with a stirrer, and acrylic acid chloride (92.8 g, 10 equivalents) was added dropwise thereto in an ice bath over 3 hours. Thereafter, the resultant mixture was stirred at room temperature for 3 hours. Disappearance of raw materials was confirmed by $^1$H-NMR, and the solvent was removed from the reaction mixture under reduced pressure. Subsequently, the reaction mixture was dried over magnesium sulfate, and filtered using Celite, and the solvent was removed under reduced pressure. Lastly, the resultant substance was purified by column chromatography (ethyl acetate/methanol=4:1), as a result of which a solid of a polymerizable compound a, which is a tetrafunctional acrylamide (corresponding to Formula (2) in which $R^1$ represents H, $R^2$ represents $C_3H_6$, $R^3$ represents $CH_2$, X, Y, and Z each represent 0), was obtained at normal temperature. The yield of the polymerizable compound a obtained through the third step was 40% by mass.

Production of Cyan Ink C1

The components of the composition described below were mixed and filtered through a glass filter (GS-25) manufactured by Toyo Roshi Kaisha Ltd., and then the resultant composition was filtered through a filter (PVDF membrane, pore size: 5 μm) manufactured by Millipore corporation, as a result of which a cyan ink C1 was obtained.

Composition of Cyan Ink C1

| | |
|---|---|
| Cyan pigment dispersion C-1 (pigment concentration: 12% by mass) | 20.8 parts |
| Hydroxyethyl acrylamide (monofunctional acrylamide) | 15 parts |
| Polymerizable compound a (water-soluble polymerizable compound) | 5 parts |
| Sorbitol (moisturizing agent) | 5.6 parts |
| OLFIN E1010 (manufactured by Nissin Chemical Industry Co., Ltd., surfactant) | 1 part |
| IRGACURE 2959 (manufactured by BASF Japan Ltd., photopolymerization initiator) | 3 parts |
| Ion exchange water | amount required to adjust the total amount of the composition to 100 parts |

Preparation of Self-Dispersing Polymer P-1

Methyl ethyl ketone (540.0 g) was placed in a 2 L-volume three-necked flask equipped with a mechanical stirrer, a thermometer, a reflux condenser, and a nitrogen gas introduction tube, and was heated to 75° C. Thereafter, while the temperature inside the flask was maintained at 75° C., a mixture solution of methyl methacrylate (108 g), isobornyl methacrylate (388.8 g), methacrylic acid (43.2 g), methyl ethyl ketone (108 g), and "V-601" (manufactured by Wako Pure Chemical Industries Ltd.) (2.1 g) was added dropwise into the flask (reaction container) at a constant rate such that the dropwise addition was completed in 2 hours. After the dropwise addition was completed, a solution of "V-601" (1.15 g) in methyl ethyl ketone (15.0 g) was added into the flask, and the resultant mixture in the flask stirred at 75° C. for 2 hours. A solution of "V-601" (0.54 g) in methyl ethyl ketone (15.0 g) was further added thereto, and the contents of the flask were stirred at 75° C. for 2 hours. Then, the temperature inside the flask was increased to 85° C., and stirring was continued for another 2 hours, as a result of which a resin solution of methyl methacrylate/isobornyl methacrylate/methacrylic acid (=20/72/8 [mass ratio]) copolymer was obtained.

The weight average molecular weight (Mw) of the obtained copolymer was 60,000. The acid value of the copolymer was 54.2 mgKOH/g.

Next, the resin solution (588.2 g) was weighed out, isopropanol (165 g) and 1 mol/L aqueous sodium hydroxide solution (120.8 ml) were added thereto, and the temperature in the reaction container was elevated to 80° C. Next, distilled water (718 g) was added dropwise thereto at a speed of 20 ml/min, and the mixture was dispersed in water. Thereafter, the temperature in the reaction container was maintained at 80° C. for 2 hours, at 85° C. for 2 hours, and at 90° C. for 2 hours under atmospheric pressure, thereby removing solvents. Further, the pressure in the reaction container was reduced, thereby removing the isopropanol, the methyl ethyl ketone, and the distilled water. As a result, an aqueous dispersion of a self-dispersing polymer having a solid content of 25.0% by mass (resin particles) was obtained.

Production of Cyan Ink C2

The components of the composition described below were mixed and filtered through a glass filter (GS-25) manufactured by Toyo Roshi Kaisha Ltd., and then the resultant composition was filtered through a filter (PVDF membrane, pore size 5 μm) manufactured by Millipore corporation, as a result of which a cyan ink C2 was obtained.

Composition of Cyan Ink C2

| | |
|---|---|
| Cyan pigment dispersion C-1 (pigment concentration: 12% by mass) | 20.8 parts |
| SANNIX GP250 (manufactured by Sanyo Chemical Industries, Ltd., water-soluble organic solvent) | 8 parts |
| TPGmME (manufactured by Wako Pure Chemical Industries, Ltd., water-soluble organic solvent) | 8 parts |
| Sorbitol (moisturizing agent) | 6 parts |
| Aqueous dispersion of self-dispersing polymer P-1 (binder resin) described above | 8 parts |
| OLFIN E1010 (manufactured by Nissin Chemical Industry Co., Ltd., surfactant) | 1 part |
| Ion exchange water | amount required to adjust the total amount of the composition to 100 parts |

Production of Cyan Ink C3

The components of the composition described below were mixed and filtered through a glass filter (GS-25) manufactured by Toyo Roshi Kaisha Ltd., and then the resultant composition was filtered through a filter (PVDF membrane, pore size 5 μm) manufactured by Millipore corporation, as a result of which a cyan ink C3 was obtained.

Composition of Cyan Ink C3

| | |
|---|---|
| CAB-O-JET250 (manufactured by Cabot Japan KK, self-dispersing pigment, pigment concentration: 12% by mass) | 20.8 parts |
| Hydroxyethyl acrylamide (monofunctional acrylamide) | 15 parts |
| Polymerizable compound a (water-soluble polymerizable compound) | 5 parts |
| Aqueous dispersion of self-dispersing polymer P-1 (binder resin) described above | 2 parts |
| Sorbitol (moisturizing agent) | 5.6 parts |
| OLFIN E1010 (manufactured by Nissin Chemical Industry Co., Ltd., surfactant) | 1 part |
| Ion exchange water | amount required to adjust the total amount of the composition to 100 parts |

Preparation of Maintenance Liquid

The Components of the following composition were mixed to prepare a maintenance liquid. The maintenance liquid was conditioned to have the pH shown in Tables 1 and 2 at 25° C., using imidazole and 1N nitric acid.

Composition of Maintenance Liquid

| | |
|---|---|
| Organic solvent A shown in Tables 1 to 2 | amount shown in Tables 1 to 2 |
| Organic solvent B shown in Tables 1 to 2 | amount shown in Tables 1 to 2 |
| OLFIN E1010 (manufactured by Nissin Chemical Industry Co., Ltd., surfactant) | amount shown in Tables 1 to 2 |
| Ion exchange water | amount required to adjust the total percentage of the components of the composition to 100% by mass |

The pH (25° C.) of each maintenance liquid immediately after the preparation (within 3 hours after preparation) is shown in Tables 1 to 2 below. In Tables 1 to 2, organic solvent A is a water-soluble organic solvent having an SP value higher than 27.5 MPa$^{1/2}$, and organic solvent B is a water-soluble organic solvent having an SP value equal to or lower than 27.5 MPa$^{1/2}$. In Tables 1 to 2, the value (for example, 33.52 in the case of glycerin) noted in the parenthesis following the indication of the type of each solvent (for example, glycerin) represents the SP value of the solvent (unit: MPa$^{1/2}$).

Evaluation

The following evaluation was carried out using each maintenance liquid. The evaluation results are shown in Tables 1 and 2.

(1) Capacity to Remove Ink-Derived Solid

Using a spray, the cyan ink produced as described above was forcibly sprayed to a surface of an inkjet recording head to which water-repellency had been imparted by application of perfluorodecyltrichlorosilane (FDTS), thereby forming attached ink droplets having droplet diameters of 50 μm or less. Next, the attached ink droplets formed were dried at room temperature for 1 hour, whereby a test piece was obtained. In order to observe the dried ink-derived masses attaching to the surface of the head, an image of 1 mm×1 mm region on the surface to which the ink-derived masses attached was taken using a digital camera installed in an optical microscope, thereby obtaining an image before dipping. The test piece after the imaging was dipped in pure water for one second such that the surface to which the ink-derived masses attached was dipped, and the test piece was taken out of the pure water.

Next, the maintenance liquid application unit disclosed in JP-A No. 2011-73295 that generates a liquid column of a cleaning liquid (corresponding to a maintenance liquid in the invention, and hereinafter referred to as "maintenance liquid") was prepared, and a liquid column of the maintenance liquid was generated. The ejection head was allowed to pass across the liquid column of the maintenance liquid at a speed of 60 mm/second, whereby the maintenance liquid attached to the surface of the head. Next, water droplets on the surface to which the ink-derived masses attached were blown away by wind pressure. Then, an image of the same region as that imaged before the dipping was taken in the same manner as that employed before the dipping, using the digital camera.

Then, the image taken before the dipping and the image taken after the dipping were compared, and the droplet diameter of the ink-derived masses remaining after the dipping was measured.

Based on these measurements, from among the ink-derived masses remaining after the dipping, an ink-derived mass that had possessed the smallest pre-dipping diameter was identified, and the post-dipping diameter thereof was assumed to be an unremovable mass minimum diameter.

The operations described above were carried out ten times, and an average value of the unremovable mass minimum diameters was calculated, and evaluated according to the following evaluation criterion.

<Evaluation Criterion>

AA: The average value of the unremovable mass minimum diameters is 20 μm or more, and the capacity to remove ink-derived solids is very high.

A: The average value of the unremovable mass minimum diameters is from 15 μm to less than 20 μm, and the capacity to remove ink-derived solids is high.

B: The average value of the unremovable mass minimum diameters is from 13 μm to less than 15 μm, and the capacity to remove ink-derived solids is at a practically acceptable level.

C: The average value of the unremovable mass minimum diameters is from 10 μm to less than 13 μm, and the capacity to remove ink-derived solids is at a practically problematic level.

D: The average value of the unremovable mass minimum diameters is less than 10 μm, and the capacity to remove ink-derived solids is at a practically very problematic level.

(2) Pigment Aggregation Properties

The particle diameter (B) of the dispersed particles present in the cyan ink produced above was measured using a fiber-optics particle analyzer FPAR-1000 (manufactured by Otsuka Electronics Co., Ltd.).

The particle diameter (A) of the dispersed particles present in a mixture liquid obtained by mixing the cyan ink and the maintenance liquid in the weight ratio of 1:99 was also measured in the same manner.

The ratio (δ) of increase in the particle diameters of the dispersed particles between before and after mixing with the maintenance liquid was calculated according to the following formula, and the pigment aggregation properties were evaluated according to the following evaluation criterion.

$$\delta = (A)/(B)$$

Evaluation Criterion

AA: δ≤1.1, not problematic at all.

A: 1.1<δ≤1.3, not problematic.

B: 1.3<δ≤1.4, occasionally causing practical problems.

C: 1.4<δ≤1.5, causing practical problems.

D: 1.5<δ, causing severe practical problems.

(3) Compatibility with Ejection Head Members

A thermally-oxidized silicon film surface of a silicon substrate having the thermally-oxidized silicon film on its surface was activated by etching with an oxygen gas in an Ar gas. Thereafter, silane coupling treatment was carried out using a silane coupling agent (product name: NANOS-B, manufactured by T & K Inc.) that contained a fluorine atom, thereby forming a 20 nm-thick silane coupling layer on the surface, and obtaining a silicon substrate having a liquid repellent film on a surface thereof.

The contact angle (α) of the cyan ink C1 prepared above with respect to the liquid repellent film was measured according to the method specified in JIS R3257, using a contact angle meter DROP MASTER DM700 (manufactured by Kyowa Interface Science Co., Ltd.).

Separately, a piece having a size of 2 cm×4 cm was cut out of the silicon substrate having a liquid repellent film on its surface obtained above. The silicon substrate piece was immersed in 50 ml of each maintenance liquid shown in Table 1 and Table 2, and allowed to stand at 45° C. for 100 hours in a hermetically sealed state. Thereafter, the silicon substrate piece was taken out of each maintenance liquid, and the contact angle (β) of the cyan ink C1 with respect to the surface of the silicon substrate piece was measured in the same manner as that described above.

Based on the value (γ) obtained by subtracting the contact angle (β) from the contact angle (α), the compatibility with ejection head members was evaluated according to the following evaluation criterion.

Evaluation Criterion

AA: γ≤15°, not problematic at all.

A: 15°<γ≤25°, not problematic.

B: 25°<γ≤35°, occasionally causing practical problems.

C: 35°<γ≤50°, causing practical problems.

D: 50°<γ, causing severe practical problems.

TABLE 1

| | | | \multicolumn{10}{c|}{Ink Set} |
| | | | 1 | 2 | 3 | 4 | 5 | 6 | 7 | 8 | 9 | 10 |
|---|---|---|---|---|---|---|---|---|---|---|---|---|
| | Ink Composition | | | | | | | | | | | |
| C1 | Aqueous UV Ink | Encapsulated Pigment | Yes | Yes | Yes | Yes | Yes | — | Yes | Yes | Yes | Yes |
| C2 | Aqueous Ink | Encapsulated Pigment | — | — | — | — | — | — | — | — | — | — |
| C3 | Aqueous UV Ink | Self-Dispersing Pigment | — | — | — | — | — | Yes | — | — | — | — |
| | Maintenance Liquid | | | | | | | | | | | |
| Composition (% by mass) | Organic Solvent A | Glycerin (33.52) | 5 | 10 | 20 | 30 | 10 | 10 | — | — | — | 10 |
| | | DEG (30.62) | — | — | — | — | — | — | 10 | 30 | — | — |
| | | 1,5-PDO (28.96) | — | — | — | — | — | — | — | — | 30 | — |
| | Organic Solvent B | PEG200 (26.14) | — | — | — | — | — | — | — | — | — | — |
| | | 1,2-HDO (24.14) | — | — | — | — | — | — | — | — | — | — |
| | | DEGmBE (21.51) | — | — | — | — | — | — | — | — | — | 3 |
| | Water | Ion-exchange Water | 94 | 89 | 79 | 69 | 89 | 89 | 89 | 69 | 69 | 86 |
| | Surfactant | OLFINE E1010 | 1 | 1 | 1 | 1 | 1 | 1 | 1 | 1 | 1 | 1 |
| | pH | | 9.2 | 9.2 | 9.2 | 9.2 | 11.2 | 9.2 | 8.7 | 8.8 | 9.0 | 9.0 |
| Evaluation | Capacity to Remove Ink-Derived Solids | | A | AA | AA | AA | AA | A | A | A | A | AA |
| | Pigment Aggregation Properties | | AA | AA | AA | A | AA | A | AA | A | A | A |
| | Compatibility With Ejection Head Members | | AA | AA | AA | AA | A | AA | AA | AA | AA | AA |
| | Remarks | | Example | Example | Example | Example | Example | Example | Example | Example | Example | Example |

* DEG: Diethylene glycol, 1,5-PDO: 1,5-pentanediol, 1,2-HDO: 1,2-hexanediol, DEGmBE: diethylene glycol monobutyl ether

TABLE 2

| | | | \multicolumn{11}{c|}{Ink Set} |
| | | | 11 | 12 | 13 | 14 | 15 | 16 | 17 | 18 | 19 | 20 | 21 |
|---|---|---|---|---|---|---|---|---|---|---|---|---|---|
| | Ink Composition | | | | | | | | | | | | |
| C1 | Aqueous UV Ink | Encapsulated Pigment | Yes | Yes | Yes | Yes | Yes | Yes | Yes | — | Yes | Yes | Yes |
| C2 | Aqueous Ink | Encapsulated | — | — | — | — | — | — | — | Yes | — | — | — |
| C3 | Aqueous UV Ink | Self-Dispersing Pigment | — | — | — | — | — | — | — | — | — | — | — |
| | Maintenance Liquid | | | | | | | | | | | | |
| Composition (% by mass) | Organic Solvent A | Glycerin (33.52) | — | — | — | — | — | 10 | 10 | 10 | 3 | 35 | 10 |
| | | DEG (30.62) | — | — | — | — | 20 | — | — | — | — | — | — |
| | | 1,5-PDO (28.96) | — | — | — | — | — | — | — | — | — | — | — |
| | Organic Solvent B | PEG200 (26.14) | — | 30 | — | — | — | — | — | — | — | — | — |
| | | 1,2-HDO (24.14) | — | — | 30 | — | — | — | — | — | — | — | — |
| | | DEGmBE (21.51) | — | — | — | 30 | 10 | — | — | — | — | — | 7 |
| | Water | Ion-exchange Water | 99 | 69 | 69 | 69 | 69 | 89 | 89 | 89 | 96 | 64 | 82 |
| | Surfactant | OLFINE E1010 | 1 | 1 | 1 | 1 | 1 | 1 | 1 | 1 | 1 | 1 | 1 |
| | pH | | — | 8.6 | 8.9 | 8.7 | 7.5 | 7.5 | 4.0 | 9.2 | 8.7 | 9.2 | 7.8 |
| Evaluation | Capacity to Remove Ink-Derived Solids | | C | B | A | AA | A | C | C | B | C | AA | A |
| | Pigment Aggregation Properties | | AA | C | C | C | C | AA | AA | C | AA | C | C |
| | Compatibility With Ejection Head Members | | AA | AA | AA | AA | A | C | D | AA | AA | AA | B |
| | Remarks | | Comp. Ex. | Comp. Ex. | Comp. Ex. | Comp. Ex. | Comp. Ex. | Comp. Ex. | Comp. Ex. | Comp. Ex. | Comp. Ex. | Comp. Ex. | Comp. Ex. |

* DEG: Diethylene glycol, 1,5-PDO: 1,5-pentanediol, 1,2-HDO: 1,2-hexanediol, DEGmBE: diethylene glycol monobutyl ether As shown in Tables 1 to 2, it was confirmed that maintenance liquids that include water (50% by mass or more) and the organic solvent A (from 5 to 30% by mass), and that have a content of the organic solvent B of less than 5% by mass and a pH of higher than 8.5 have excellent capacity to remove ink-derived solids generated by solidification of an ink composition including a pigment, a water-soluble polymerizable compound, and water, and remarkably suppress aggregation of the pigment contained in the ink composition (see the results obtained using ink sets 1 to 10). It was also confirmed that the maintenance liquids have high compatibility with ejection head members (see the results obtained using ink sets 1 to 10).

It was confirmed that these effects are more conspicuous when maintenance liquids including the organic solvent A in a range of from 10 to 20% by mass are used.

Maintenance liquids in which the content of the organic solvent B was 5% by mass or higher exhibited inferior properties with respect to inhibition of aggregation of the pigment contained in the ink composition (see the results obtained using ink sets 12 to 15 and 21).

Maintenance liquids that included water (50% by mass or higher) and the organic solvent A (from 5 to 30% by mass), and that had a content of the organic solvent B of less than 5% by mass and a pH of 8.5 or lower exhibited inferior capacity to remove ink-derived solids (see the results obtained using ink sets 16 and 17).

Further, when an aqueous ink not including a water-soluble polymerizable compound is used, even a maintenance liquid that included water (50% by mass or higher) and the organic solvent A (from 5 to 30% by mass), and that had a content of the organic solvent B of less than 5% by mass and a pH of higher than 8.5 exhibited inferior capacity to dissolve the ink-derived solids and inferior pigment aggregation properties (see ink set 18).

In the ink set according to the invention, an ink composition and a maintenance liquid suitable for the ink composition are combined. From the results shown above, it is understood that the combined use of the ink composition and the maintenance liquid as a set enables removal of solids generated from the ink composition with high cleaning efficiency, and enables the quality of ejection of the ink composition to be stably maintained due to suppression of generation of pigment aggregates upon contact between the maintenance liquid and the ink composition, and enables formation of high quality images.

All publications, patent applications, and technical standards mentioned in this specification are herein incorporated by reference to the same extent as if each individual publication, patent application, or technical standard was specifically and individually indicated to be incorporated by reference.

The invention claimed is:
1. An ink set for inkjet recording, comprising:
an ink composition including a pigment, a water-soluble polymerizable compound, and water; and
a maintenance liquid that has a pH higher than 8.5 and that includes water and a water-soluble organic solvent having an SP value higher than 27.5 MPa$^{1/2}$, an amount of water contained in the maintenance liquid being 50% by mass or more with respect to the total amount of the maintenance liquid, an amount of water-soluble organic solvent contained in the maintenance liquid having an SP value higher than 27.5 MPa$^{1/2}$ being from 5 to 30% by mass with respect to the total amount of the maintenance liquid, and an amount of water-soluble organic solvent contained in the maintenance liquid having an SP value of 27.5 MPa$^{1/2}$ or lower being less than 5% by mass with respect to the total amount of the maintenance liquid.

2. The ink set for inkjet recording according to claim 1, wherein the water-soluble organic solvent having an SP value higher than 27.5 MPa$^{1/2}$ is a polyhydric alcohol.

3. The ink set for inkjet recording according to claim 1, wherein the water-soluble organic solvent having an SP value higher than 27.5 MPa$^{1/2}$ is at least one polyhydric alcohol selected from the group consisting of ethyleneglycol, diethyleneglycol, propyleneglycol, glycerin, diglycerin, 1,4-butanediol, 1,5-pentanediol, and 1,6-hexanediol.

4. The ink set for inkjet recording according to claim 1, wherein the maintenance liquid has a pH of from more than 8.5 to 10.0.

5. The ink set for inkjet recording according to claim 4, wherein the content of water-soluble organic solvent having an SP value higher than 27.5 MPa$^{1/2}$ is from 10 to 20% by mass with respect to the total amount of the maintenance liquid.

6. The ink set for inkjet recording according to claim 5, wherein the maintenance liquid further comprises an acetyleneglycol-based surfactant.

7. The ink set for inkjet recording according to claim 6, wherein the water-soluble polymerizable compound is a compound having a (meth)acrylamide structure in a molecule thereof.

8. The ink set for inkjet recording according to claim 1, wherein the amount of water-soluble organic solvent having an SP value higher than 27.5 MPa$^{1/2}$ is from 10 to 20% by mass with respect to the total amount of the maintenance liquid.

9. The ink set for inkjet recording according to claim 1, wherein the maintenance liquid further includes a surfactant.

10. The ink set for inkjet recording according to claim 9, wherein the surfactant is a nonionic surfactant.

11. The ink set for inkjet recording according to claim 10, wherein the nonionic surfactant is an acetyleneglycol-based surfactant.

12. The ink set for inkjet recording according to claim 1, wherein the ink set satisfies the following formula:

$$(A)/(B) \leq 1.1$$

wherein (A) represents a diameter of dispersed particles present when the maintenance liquid is added to the ink composition to dilute the ink composition 100-fold, and (B) represents a diameter of dispersed particles present in the ink composition before dilution.

13. The ink set for inkjet recording according to claim 1, wherein the pigment is a polymer-coated pigment in which at least a part of a surface of the pigment is covered with a polymer.

14. The ink set for inkjet recording according to claim 1, wherein the pigment is a polymer-coated pigment in which at least a part of a surface of the pigment is covered with a polymer by a phase inversion emulsification method.

15. The ink set for inkjet recording according to claim 1, wherein the pigment is a polymer-coated pigment in which at least a part of a surface of the pigment is covered with a cross-linked polymer obtained by cross-linking a water-soluble dispersant using a crosslinking agent.

16. The ink set for inkjet recording according to claim 1, wherein the water-soluble polymerizable compound is a compound having a (meth)acrylamide structure in a molecule thereof.

17. The ink set for inkjet recording according to claim 1, wherein
the water-soluble organic solvent having an SP value higher than 27.5 MPa$^{1/2}$ is selected from the group consisting of glycerin, diethylene glycol, and 1,5-pentanediol,
when the maintenance liquid includes a water-soluble organic solvent having an SP value of 27.5 MPa$^{1/2}$ or lower, the water-soluble organic solvent having an SP value of 27.5 MPa$^{1/2}$ or lower is diethyleneglycol monobutyl ether,
the amount of water contained in the maintenance liquid is from 69% by mass to 94% by mass with respect to the total amount of the maintenance liquid,
the pigment contained in the ink composition is an encapsulated pigment or a self-dispersing pigment,
the ink composition further includes a moisturizing agent and a surfactant, the water-soluble polymerizable compound contained in the ink composition includes hydroxyethyl acrylamide and the following Polymerizable Compound a,
the total content of polymerizable compounds in the ink composition is from 15% by mass to 40% by mass with respect to the total amount of the ink composition, and
the content of the pigment in the ink composition is from 1% by mass to 10% by mass with respect to the total amount of the ink composition;

Polymerizable Compound a

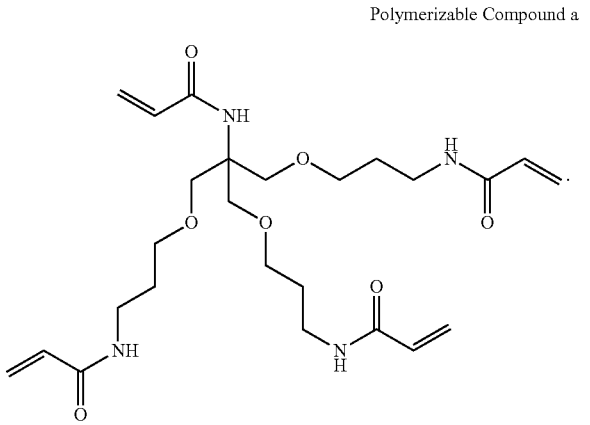 [SMILES: C=CC(=O)NCCCOCC(COCCCNC(=O)C=C)(COCCCNC(=O)C=C)NC(=O)C=C]

18. An image forming method, comprising:
applying an ink composition to a recording medium by ejecting the ink composition from an inkjet recording head, the ink composition including a pigment, a water-soluble polymerizable compound, and water; and
removing, using a maintenance liquid, any of the ink composition that has attached to the inkjet recording head, the maintenance liquid having a pH higher than 8.5 and including water and a water-soluble organic solvent having an SP value higher than 27.5 $MPa^{1/2}$, the amount of water contained in the maintenance liquid being 50% by mass or more with respect to the total amount of the maintenance liquid, the amount of water-soluble organic solvent contained in the maintenance liquid having an SP value higher than 27.5 $MPa^{1/2}$ being from 5 to 30% by mass with respect to the total amount of the maintenance liquid, and an amount of water-soluble organic solvent contained in the maintenance liquid having an SP value of 27.5 $MPa^{1/2}$ or lower being less than 5% by mass with respect to the total amount of the maintenance liquid.

* * * * *